US011238543B2

(12) United States Patent
Linne

(10) Patent No.: US 11,238,543 B2
(45) Date of Patent: Feb. 1, 2022

(54) PAYROLL BASED BLOCKCHAIN IDENTITY

(71) Applicant: ADP, LLC, Roseland, NJ (US)

(72) Inventor: Anna Linne, Mendham, NJ (US)

(73) Assignee: ADP, LLC, Roseland, NJ (US)

(*) Notice: Subject to any disclaimer, the term of this patent is extended or adjusted under 35 U.S.C. 154(b) by 639 days.

(21) Appl. No.: 15/588,606

(22) Filed: May 6, 2017

(65) Prior Publication Data

US 2018/0322587 A1    Nov. 8, 2018

(51) Int. Cl.
*G06Q 40/00*    (2012.01)
*H04L 29/06*    (2006.01)
*H04L 9/32*    (2006.01)

(52) U.S. Cl.
CPC ......... *G06Q 40/125* (2013.12); *H04L 9/3236* (2013.01); *H04L 9/3297* (2013.01); *H04L 63/105* (2013.01); *G06Q 2220/00* (2013.01); *H04L 2209/38* (2013.01)

(58) Field of Classification Search
CPC .............. G06Q 40/125; G06Q 2220/00; H04L 9/3236; H04L 9/3297; H04L 63/105; H04L 2209/38
See application file for complete search history.

(56) References Cited

U.S. PATENT DOCUMENTS

| 2002/0169625 A1* | 11/2002 | Yang | G06F 21/10 705/59 |
| 2016/0330027 A1* | 11/2016 | Ebrahimi | G06F 21/34 |
| 2019/0007402 A1* | 1/2019 | Andrade | H04L 63/08 |
| 2019/0050832 A1* | 2/2019 | Wright | H04L 9/3066 |

OTHER PUBLICATIONS

Garman et al., "Decentralized Anonymous Credentials", The John Hopkins university Department of Computer Science, Baltimore, USA, 15 pages.
Baars et al., "Towards Self-Sovereign Identity using Blockchain Technology", University of Twente, Enschede, Netherlands 90 pages.

* cited by examiner

*Primary Examiner* — John W Hayes
*Assistant Examiner* — Ari Shahabi
(74) *Attorney, Agent, or Firm* — Yee & Associates, P.C.

(57) ABSTRACT

A method of using a distributed ledger maintained solely in a computer network. Wage payment information is received from an employer regarding an employee. A copy of a digital public key uniquely associated with the employee is received. A transaction is issued to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee. A level of the multi-level identity data can be made available to a third party upon being identified with the data level code and upon being decrypted with the digital signing key.

23 Claims, 12 Drawing Sheets

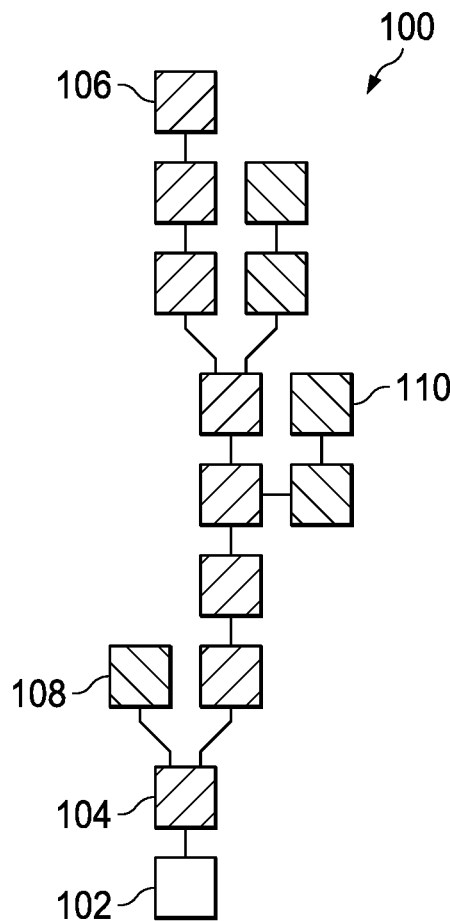
FIG. 1
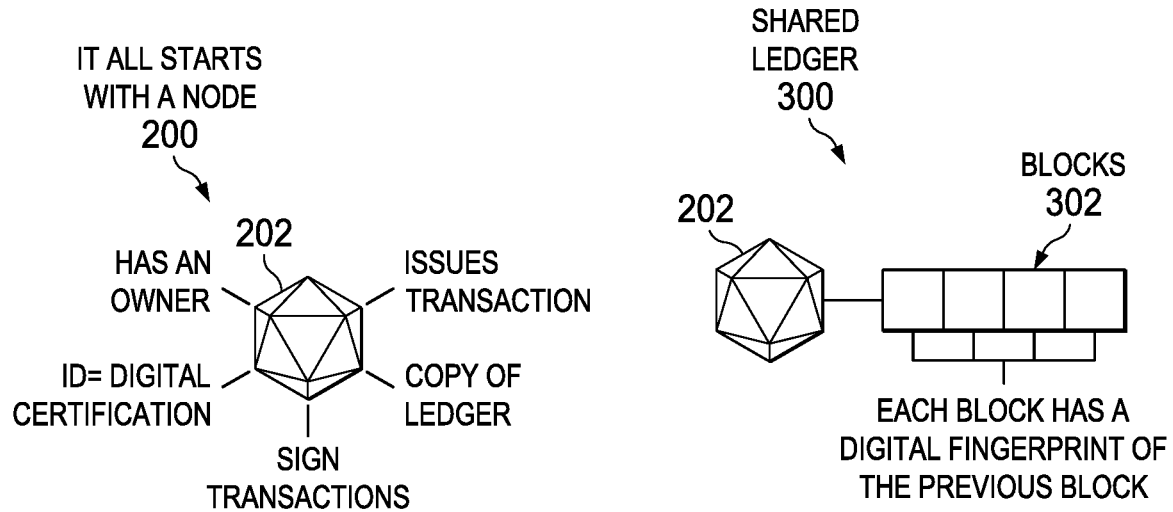
FIG. 2
FIG. 3

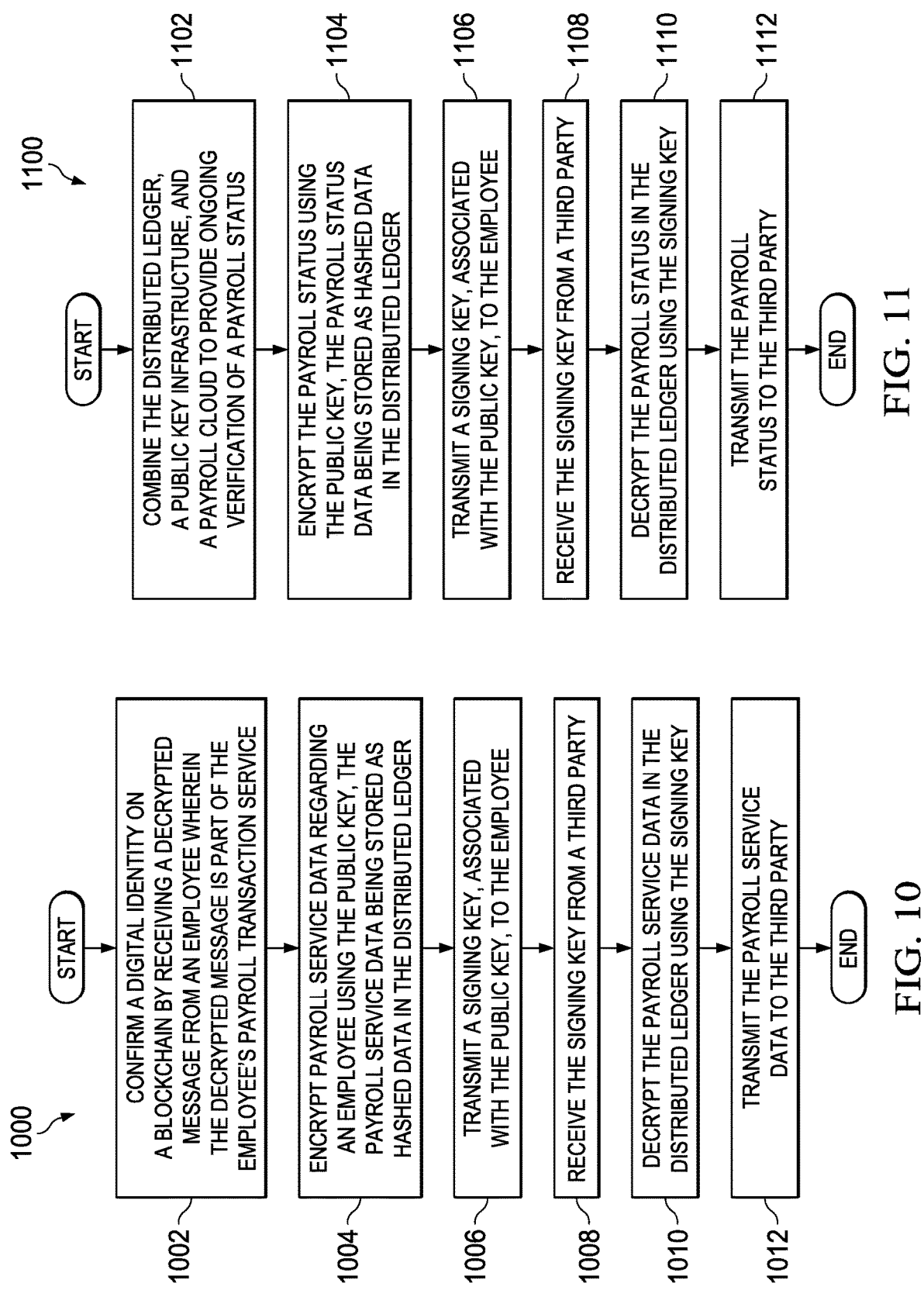

PAYROLL BASED BLOCKCHAIN IDENTITY

CROSS-REFERENCE TO RELATED APPLICATION(S)

This application is related to U.S. patent application Ser. No. 15/588,607, filed May 6, 2017, titled "Implementation of Payroll Smart Contract on a Distributed Ledger,".

BACKGROUND INFORMATION

1. Field

The present disclosure relates to use of distributed ledgers implemented solely in a computer network in payroll tracking, employee information tracking, employer information tracking, and identity security in a digital environment.

2. Background

A distributed ledger, as used throughout this document, refers to a computer-only technology that enables the distributed recordation of transactions through a distributed ledger maintained by a network of computers. A blockchain is an example of a distributed ledger. BITCOIN® is an example of blockchain technology application.

A blockchain is a type of distributed ledger, which includes digitally recorded, unmodifiable data in packages called blocks. A distributed ledger is a consensus of replicated, shared, and synchronized digital data geographically spread across multiple computers which may be in different sites, countries, and/or institutions maintained by many different parties. A distributed ledger can be public, such as BITCOIN®, where there is no limitation on who may participate in the network, or private, where only approved parties are permitted to participate in the network.

SUMMARY

The illustrative embodiments provide for a computer-implemented method of using a distributed ledger maintained solely in a computer network. The computer-implemented method includes receiving, at a computer network, a wage payment information from an employer regarding an employee. The computer-implemented method also includes referencing, by least one server computer within the computer network, a copy of a digital public key uniquely associated with the employee. The computer-implemented method also includes issuing, by at least one server computer within the computer network, a transaction to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee. A level of the multi-level identity data of the employee can be made available to a third party upon being identified with the data level code and upon being decrypted with the digital signing key.

The illustrative embodiments also include a computer including a processor and a non-transitory computer recordable storage medium in communication with the processor and storing computer code which, when implemented by the processor, implements a computer-implemented method of using a distributed ledger maintained solely in a computer network. The computer code includes computer code for receiving, at a computer network, a wage payment information from an employer regarding an employee. The computer code also includes computer code for receiving, at least one server computer in the computer network, a copy of a digital public key uniquely associated with the employee. The computer code also includes computer code for issuing, by the at least one server computer, a transaction to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee. The computer code also includes additional code such that a level of the multi-level identity data of the employee can be made available to a third party upon being identified with the data level code and upon being decrypted with the digital signing key.

The illustrative embodiments also provide for a non-transitory computer recordable storage medium storing computer code which, when implemented by a processor, implements a computer-implemented method of using a distributed ledger maintained solely in a computer network. The computer code includes computer code for receiving, at a computer network, a wage payment information from an employer regarding an employee. The computer code also includes computer code for receiving, at least one server computer in the computer network, a copy of a digital public key uniquely associated with the employee. The computer code also includes computer code for issuing, by the at least one server computer, a transaction to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee. The computer code also includes additional code such that a level of the multi-level identity data of the employee can be made available to a third party upon being identified with the data level code and upon being decrypted with the digital signing key.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is a block diagram of a distributed ledger in the form of a blockchain in accordance with an illustrative embodiment;

FIG. 2 is a block diagram illustrating a first step in creating a blockchain in accordance with an illustrative embodiment;

FIG. 3 is a block diagram illustrating a second step in creating a blockchain in accordance with an illustrative embodiment;

FIG. 10 is a flowchart of using a distributed ledger implemented solely in a computer network in accordance with an illustrative embodiment;

FIG. 11 is a flowchart of a method of using a distributed ledger implemented solely in a computer network in accordance with an illustrative embodiment;

DETAILED DESCRIPTION

Figure 4:
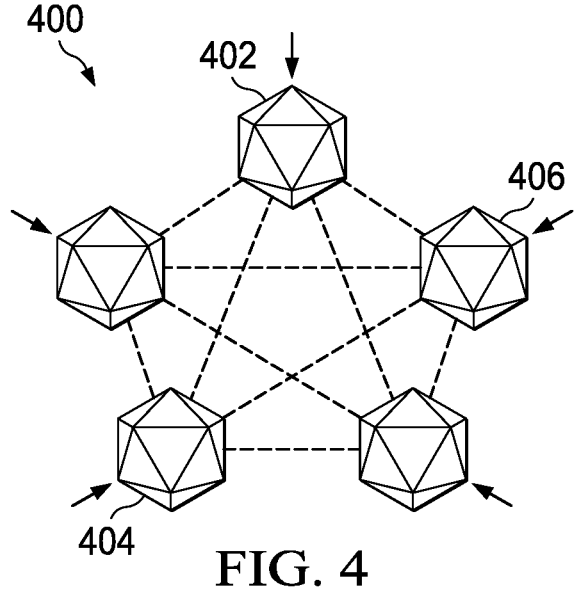
FIG. 4 is a block diagram illustrating a third step in creating a blockchain in accordance with an illustrative embodiment.

The illustrative embodiments recognize and take into account that it would be valuable to achieve a decentralized, yet verified, identity data management system based on payroll transactions. Thus, for example, in an illustrative embodiment when a payroll agent, a payroll company or a payroll department of a company, makes a wage payment to an employee, it issues an encrypted ledger on the blockchain, along with the employee's identity data. A service needing to consume the employee's identity data (name, social security number, date of birth, address, etc.) may be given a pointer to the transaction on the blockchain.

The illustrative embodiments recognize and take into account that it would be advantageous to allow an employee to grant permission to selective identity data on the blockchain. Thus, the illustrative embodiments provide for breaking down identity data down into segments. An employee can choose to decrypt any segment or segments to a third party service to consume.

The illustrative embodiments also recognize and take into account that it would be advantageous to allow an employee to further grant permission to access data off the blockchain based on granting of permission by the employee or the employer. Thus, the illustrative embodiments provide for allowing a payroll service, whether in-house to a company or provided by a third party payroll service, to reconcile a physical identity with a digital identity, with potential access to secure identity data based on permission.

The illustrative embodiments also recognize and take into account that traditionally identity proofing has been performed either in-person, relying primarily on a picture ID, or remotely, relying primarily on knowledge-based verification. However, knowledge-based verification is no longer effective as desired. Thus, remote identity proofing calls for research on brand new methods of identification.

In countries like the United States where residents do not have a national identity card, secure identity proofing is difficult but essential for cybersecurity. Effective methods of remote identity proofing would not only make it easier for residents to seek government services, but would also enable new ways of doing business, such as remotely opening a bank account or applying for a mortgage. Thus, the illustrative embodiments combine blockchain, public key infrastructure technology, and a payroll cloud to provide remote identity proofing, ongoing verification, and layered identity data access.

The illustrative embodiments recognize and take into account that a payroll agent can receive an employee's wage payment information from an employer, and have access to a copy of the employee's digital public key. The payroll company issues a transaction to a blockchain at the time of wage issuance, along with identity data encrypted with the employee's public key, with the blockchain identity data capable of being used to prove identity to a third party upon the employee's demonstrated decryption of the identity data with the employee's signing key. Optionally, the public and signing key pair may belong to an employer. Optionally, the public and signing key pair may be a special purpose key used solely for identity proofing on a distributed ledger.

The signing key is part of public key cryptography. Public key cryptography is a cryptographic technique that enables entities to securely communicate on an insecure public network, and reliably verify the identity of an entity via digital signatures. Under the public key infrastructure (PKI), a signing key which is usually privately held by a user and generally referred as the private key, has a unique mathematical relationship to a verification key which is usually made public and generally referred to as the public key. The signing key may also be known as a private key. The signing key and the verification key form a key pair. When a text is encrypted with the signing key, one could only decrypt the text with the verification key from the key pair. Therefore, encrypting a text with a user's signing key demonstrates the text's origin from the user as the text is decrypted with the same user's verification key. On the other hand, if a text is encrypted with the user's publicly available verification key, the text can only be decrypted with the user's privately held signing key.

Distributed ledgers may take advantage of other cryptographic techniques. Another technique is known as hashing. A cryptographic hash is like a signature for a text or a data file. The SHA (secure hash algorithm) is one of a number of cryptographic hash functions. For example, the SHA-256 algorithm generates an almost-unique, fixed size 256-bit (32-byte) hash for any length of text or images. Additionally, the SHA-256 algorithm can generate a fixed size 256-bit (32-byte) hash for the entire library of congress just as it would for someone's social security number. A hash operation is a one way function; it cannot be decrypted back.

The illustrative embodiments also recognize and take into account that, in addition, the identity data may be multi-level identity data based on levels of data sensitivity. In this manner, the employee may be given complete control over which data to provide to the third party.

In addition, the illustrative embodiments recognize and take into account that the identity data may also be encrypted with the payroll agent's signing key to confirm the payroll company's identity, or the employer's public key to give the employer control over access permission to the identity data. In addition, the identity data can be any off-chain data about an employee, such as employment history, credentials, skills, appraisals, training, or any other information for the employee to grant access to any third party about such information.

In addition, the illustrative embodiments recognize and take into account that in an event where a signing key is compromised or lost, the payroll agent can recreate transactions on the blockchain using a new key or create records to link the two digital identities to the same employee. Thus, the payroll agent can keep record of the sets of public and signing key pairs associated with an employee and can reconcile multiple digital identities to the employee on the blockchain.

Furthermore, the illustrative embodiments recognize and take into account that employee's hashed identity data may be stored on the distributed ledger, and a third party may verify that employee identity by comparing the stored hashed data with hashed value of employee supplied data. The illustrative embodiments recognized that this illustrative embodiment may be layered with different security levels as well.

The illustrative embodiments also recognize and take into account that a smart contract on the blockchain may be used to dynamically provide identity data to a third party. A set of special purpose encryption/decryption key may be utilized by the payroll agent. An example of pseudo-code to implement this illustrative embodiment is as follows:

```
contract
verify_Identity {employee_digital_sigature,
level_of_access_code optional, third_party_secure_address
        . . .
            /*verify if the digital signature is from the
employee, */
        If Verify (employee_digital_signature,
employee_public_key) = true
            /* the payroll agent can retrieve the decryption
from an off-chain location or the decryption key can be
provided by the employee to the third party */
            Send (encrypted data (level_of_access_code),
decryption_key optional third_party_secure_address
        }
```

The illustrative embodiments also recognize and take into account that biometrics such as fingerprint, finger vein, palm vein, and iris recognition can be part of identity management and can be stored in hash value on and off the blockchain for identity verification purposes. Many other illustrative embodiments are possible and some are described herein.

Thus, the illustrative embodiments are not necessarily limited by the above summary description.

Thus, the illustrative embodiments provide for a technology that would allow an employee to provide digital identity proofing online based on his or her payroll transaction. In particular, a payroll agent may post a payroll transaction which includes: an employee's unique identifier, encrypted wage; encrypted personal data in multiple data sensitivity levels, and a date stamp. The unique identifier may be a hash of the employee's personal data, such as but not limited to social security number, date of birth, name, address, telephone number driver's license number, professional license number, or possibly other information. The encryption is performed using the employee's public key and the employee is the only person who could decrypt the information with his or her private key.

When a third party wants to verify the employee's identity, the employee accesses the blockchain, shares the hash unique identifier pointer with the third party and decrypts any part of the encrypted personal information with the third party. The technique, for example, could include putting in a password on a machine where the private key resides.

The illustrative embodiments provide for distributed payroll information on a blockchain with encrypted personal data, allowing an employee to give permission to access his or her personal data, which has never been done before. With each employee having an unique hash as an identifier, a blockchain can accommodate a wealth of employee data, which could then be linked to data off-blockchain, possibly with employee permission for anyone to gain access.

The illustrative embodiments also provide for the ability of an employer to also participate in this permission granting data access. If the payroll agent, or anyone who can publish the data on the blockchain, also encrypts certain data with the employer's public key, then only the employer can decrypt. Data may be simultaneously encrypted with employer and employee's public keys.

The illustrative embodiments have several uses. For example, payroll agents who want to publish payroll transactions along with identity information to verify employee data could do so. In another illustrative embodiment, anyone, such as but not limited to a bank, a hospital, etc., who can physically verify a person is then publishing a transaction with the identity data to the blockchain. A third party who wants to use blockchain to verify a person's digital identity may also do so.

Still further, a payroll agent could link multiple sets of digital public keys to an individual. This link would allow a query to be made for a more complete history of an employee. This linkage could be implemented as follows. The payroll agent could convert the employee personal information, such as but not limited to those types of information described above, into a hash. This unique hash will become the employee's key for querying. Even when the employee has different signing keys and verification key pairs, the hash will remain the same. Thus, use of the same hash across multiple accounts would allow a single payroll agent to access one employee's multiple accounts on the blockchain, thereby provide for increased security and speed of access to information on the multiple accounts. Accordingly, the illustrative embodiments provide for a payroll based blockchain identity.

FIG. 1 is a block diagram of a distributed ledger in the form a blockchain in accordance with an illustrative embodiment. Blockchain 100 is a blockchain, which is a specific implementation of a distributed ledger. Blockchain 100 is described to introduce blockchain concepts.

Blockchain 100 starts with genesis block 102. Blocks indicated with a right-leaning hash, such as block 104 or block 106, are part of the main chain. Blocks with a left leaning hash, such as block 108 or block 110, exist outside blockchain 100.

Stated more formally, a blockchain is a distributed database that maintains a continuously growing list of ordered records called blocks. Each block contains a timestamp and a link to a previous block, with the hash of the prior block linking the two. By design, blockchains are inherently resistant to modification of the data because, once recorded, the data in a block cannot be altered retroactively. Through the use of a peer-to-peer network and one or more distributed timestamping servers, a blockchain database may be managed autonomously. Thus, blockchains may be used to provide an open, distributed ledger that can record transactions between parties efficiently and in a verifiable and permanent way.

Distributed ledgers, and blockchains in particular, are secure by design. Blockchains have a high byzantine fault tolerance. Thus, decentralized consensus can be achieved with a blockchain. The first blockchain was created by Satoshi Nakamoto in 2008 and implemented the following year as a core component of the digital currency BITCOIN®, where it serves as the public ledger for all transactions. BITCOIN® was the first digital currency to solve the double spending problem, without the use of a trusted authority or central server.

Figure 5:
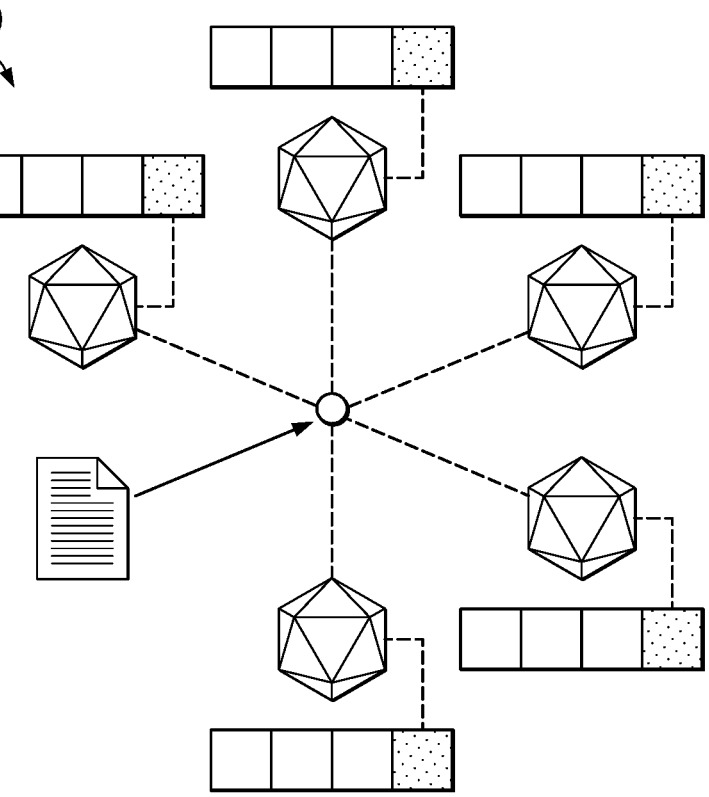
FIG. 5 is a block diagram illustrating a fourth step in creating a blockchain in accordance with an illustrative embodiment.
Figure 6:
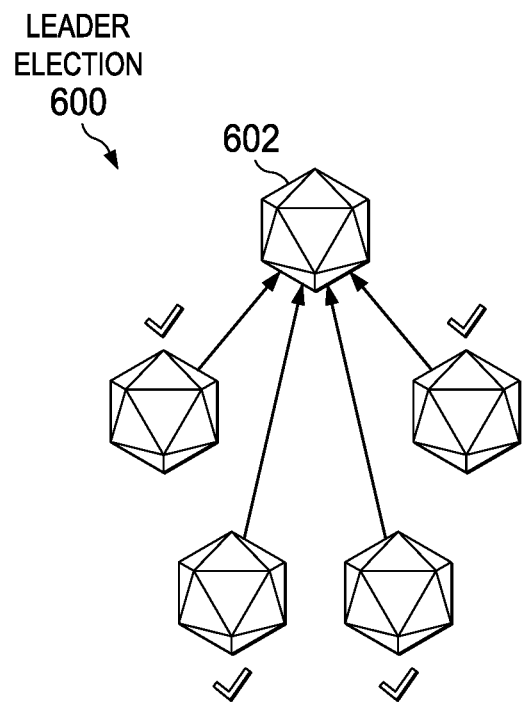
FIG. 6 is a block diagram illustrating a fifth step in creating a blockchain in accordance with an illustrative embodiment.
Figure 7:
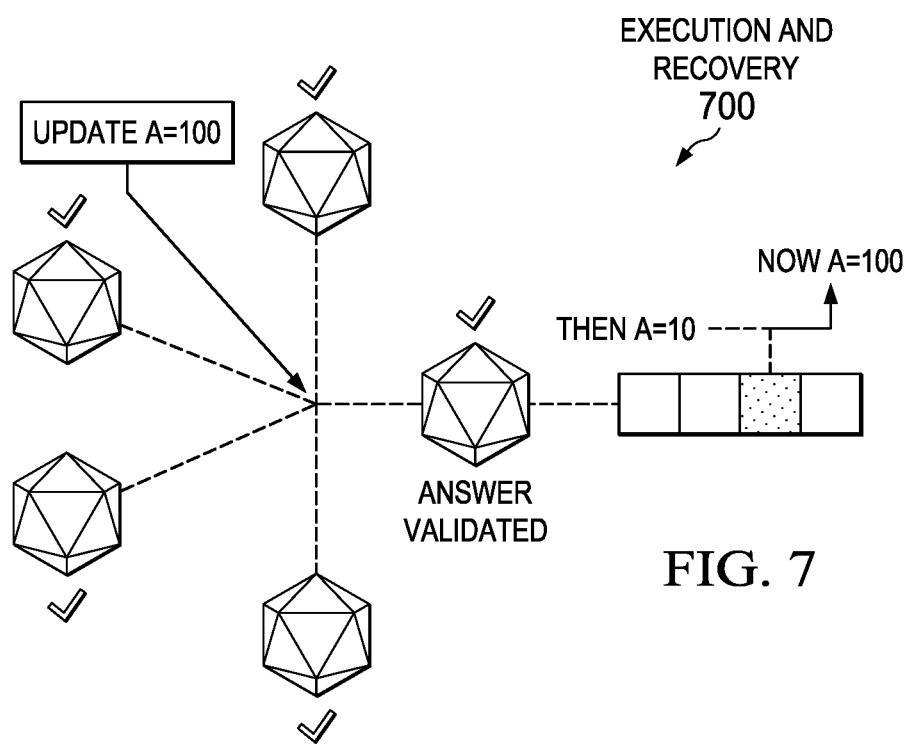
FIG. 7 is a block diagram illustrating a sixth step in creating a blockchain in accordance with an illustrative embodiment.

FIG. 2 through FIG. 7 should be considered together. FIG. 2 is a block diagram illustrating a first step in creating a blockchain in accordance with an illustrative embodiment. FIG. 3 is a block diagram illustrating a second step in creating a blockchain in accordance with an illustrative embodiment. FIG. 4 is a block diagram illustrating a third step in creating a blockchain in accordance with an illustrative embodiment. FIG. 5 is a block diagram illustrating a fourth step in creating a blockchain in accordance with an illustrative embodiment. FIG. 6 is a block diagram illustrating a fifth step in creating a blockchain in accordance with an illustrative embodiment. FIG. 7 is a block diagram illustrating a sixth step in creating a blockchain in accordance with an illustrative embodiment. FIG. 2 through FIG. 7 may be implemented on a computer or on multiple computers in a network environment. FIG. 2 through FIG. 7 addresses a technical problem that only exists in computer programming and execution. As used throughout FIG. 2 through FIG. 7, common reference numerals refer to common objects in these figures.

In operation 200 shown in FIG. 2, node 202 is created which contains the initial data for the distributed ledger. Node 202 includes an owner, a digital certificate identification, and a copy of a ledger. Node 202 may issue transactions. Node 202 may sign transactions.

In operation 300 shown in FIG. 3, blocks 302 are added to node 202. Each block in the shared ledger has a digital fingerprint of the previous block. In this manner, it is not possible to alter previous blocks without being detected.

In operation 400 shown in FIG. 4, blockchain network 402 is formed. Blockchain network 402 may include multiple blockchains such as those shown in FIG. 2 or FIG. 3. Each blockchain has its own node, such as node 404 or node 406.

In operation 500 shown in FIG. 5, transactions and distributions are added to the various nodes. Thus, blocks are added to each node.

In operation 600 shown in FIG. 6, leader election takes place. In this operation, leader node 602 is elected. Leader node 602 takes priority for deciding which information is the most accurate or up to date.

In operation 700 shown in FIG. 7, data execution and recovery takes place. A query regarding data stored in one or more of the nodes may return a validated answer regarding contents in the blocks.

Another description of blockchain technology is now presented. Blockchain technology enables the distributed recordation of transactions through a distributed ledger. As indicated above, BITCOIN® is an example of a blockchain technology application. Blockchain is a type of distributed ledger, comprised of digitally recorded, unmodifiable data in packages called blocks. A distributed ledger is a consensus of replicated, shared, and synchronized digital data geographically spread across multiple sites, countries, and/or institutions.

These digitally recorded "blocks" of data are stored in a linear chain. Each block in the chain contains data (for example a BITCOIN® transaction), is cryptographically hashed. The blocks of hashed data draw upon the previous-block which came before it in the chain, ensuring all data in the overall blockchain has not been tampered with and remains unchanged.

Figure 8:
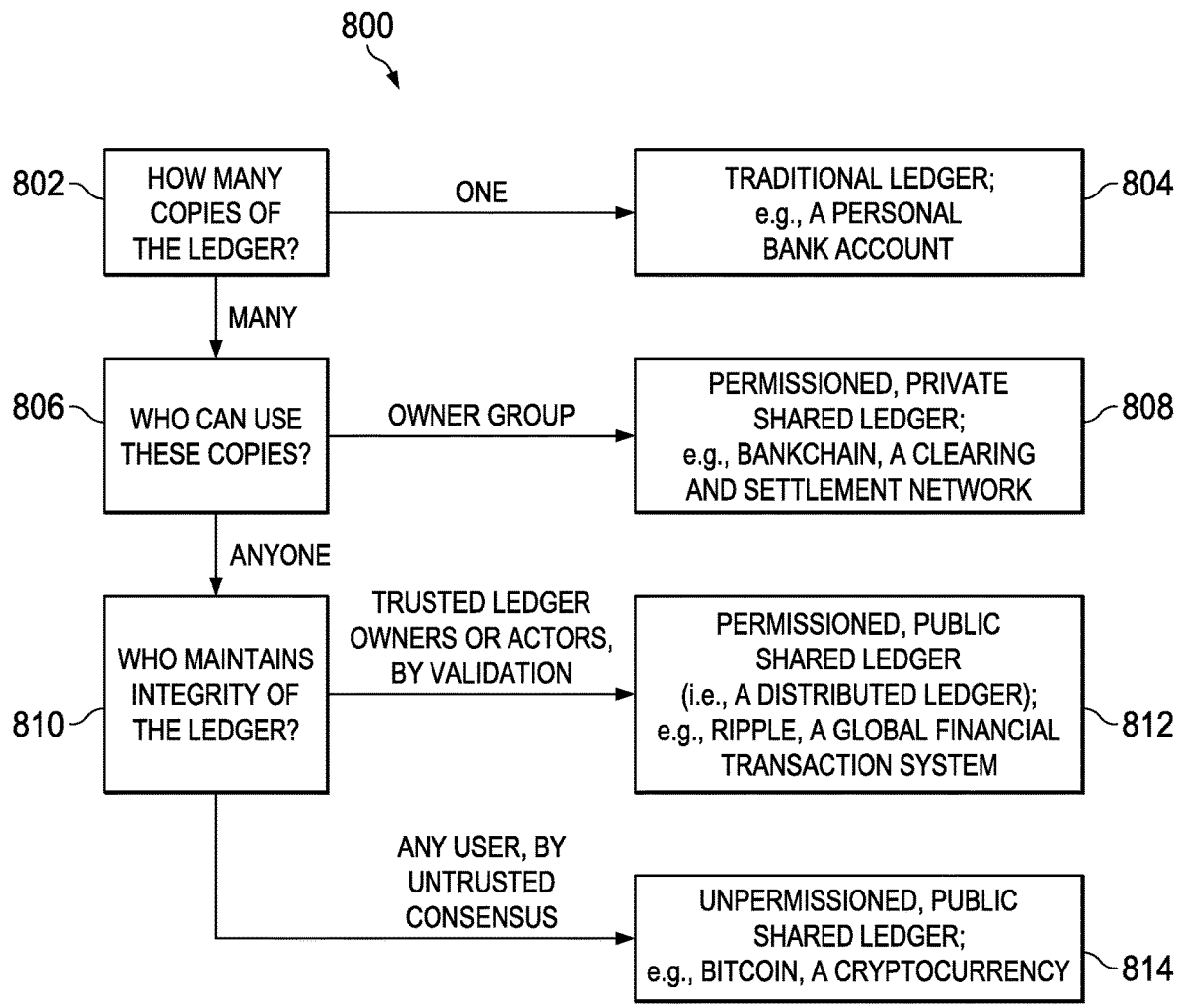
FIG. 8 is a block diagram illustrating different types of distributed ledgers, including blockchains, in accordance with an illustrative embodiment.

FIG. 8 is a block diagram illustrating different types of distributed ledgers, including blockchains, in accordance with an illustrative embodiment. Block diagram 800 of FIG. 8 is not a flowchart, but rather a way of looking at distributed ledger technology types. The distributed ledger types described with respect to FIG. 8 may be used with respect to the illustrative embodiments described herein, but only with respect to computer technologies. The illustrative embodiments do not function using writing implements or mental thought, because a technical solution to a computer problem is addressed by the illustrative embodiments. Namely, using distributed ledger technology in a secured, multi-level security environment for electronic payroll services.

In considering distributed ledger technology, one question to ask is how many copies are there of the ledger (see block 802). If only one copy of the ledger is present, the ledger is like a traditional ledger (see block 804), such as a personal bank account. However, if many ledgers are present, then another question to ask is who can use the copies of the ledgers (block 806).

If an owner group can use the copies of the ledgers, then a permissioned, private shared ledger is present (see block 808). Examples of these ledgers may be a bankchain, a clearing and settlement network, and other. However, if anyone can use the ledger, then another question to ask is who maintains the integrity of the ledger (see block 810).

If only trusted ledger owners or actors can maintain the integrity of the ledger, usually by some kind of validation process, then a permissioned, public shared ledger is being used (see block 812). This type of ledger is a distributed ledger. Examples of this type of ledger are RIPPLE®, or a global financial transaction system.

However, if any user, by untrusted consensus, can maintain the integrity of the ledger, then an unpermissioned, public shared ledger is being used (see block 814). An example of this kind of distributed ledger is BITCOIN®, which is a blockchain cryptocurrency.

A blockchain is just one type of distributed ledger. Not all distributed ledgers necessarily employ blocks or chain transactions. Although the term 'blockchain' is used more frequently than 'distributed ledger' in discussions, a blockchain is only one of the many types of data structures that provide secure and valid achievement of distributed consensus. The BITCOIN® blockchain, which uses 'proof-of-work mining,' is the most publicly proven method used to achieve distributed consensus. However, other forms of distributed ledger consensus exist such as ETHEREUM®, RIPPLE®, HYPERLEDGER®, MULTICHAIN®, ERIS®, and other private enterprise solutions. Users of distributed ledger technology (DLT) may significantly benefit from the efficiencies and economics by creating a more robust environment for real-time and secure data sharing.

In a completely separate area of computer security, cryptography can be used to keep exchanges secure. A blockchain provides a decentralized database, or digital ledger, of transactions that everyone on the network can see. This network is essentially a chain of computers that must all approve an exchange before it can be verified and recorded.

SHOCARD® uses the BLOCKCYPHER® transaction application programming interface (API) to publish identity data to the BITCOIN® and other blockchains. SHOCARD® created an identity management application that uses public/signing key encryption and data hashing to safely store and exchange identity data. This identity data includes biometrics like fingerprints, facial maps, iris patterns, and voice. Through the SHOWCARD® application, a person may securely manage and carry her identity data on his or her mobile phone.

Others attempt to consolidate all digital identities using a global identity system. Another solution has a bank as an identity source, utilizing the public key infrastructure. However, the known art fails to provide a system that would, on an ongoing basis, provide verification to align a digital identity to a physical identity, and one that would provide a subject with the ability to grant different levels of granular identity data access to different entities. The illustrative embodiments provide for this technology.

Generally speaking, identity management is increasingly an issue in the information age. However, most work in identity management is focusing on authentication rather than identity proofing. Most authentication techniques require prior registration of the person to be authenticated either with a service provider that requires authentication in order to provide a service, or with an identity provider that the service provider relies upon to authenticate the subscriber. Hence, such techniques require a prior relationship between the subscriber and the party that performs the authentication. By contrast, in identity proofing, the subject to be identified may have no prior relationship with the verifier that performs the proofing. Therefore, most authentication techniques are not applicable to identity proofing.

Traditionally, identity proofing has been performed either in-person, relying primarily on a picture identification, or remotely, relying primarily on knowledge-based verification. Because knowledge-based verification is ineffective in identity proofing, remote identity proofing calls for research on brand new methods of identification. Effective methods of remote identity proofing would not only make it easier for people to seek government services, but would also enable new ways of doing business, such as remotely opening a bank account or applying for a mortgage.

Figure 9:
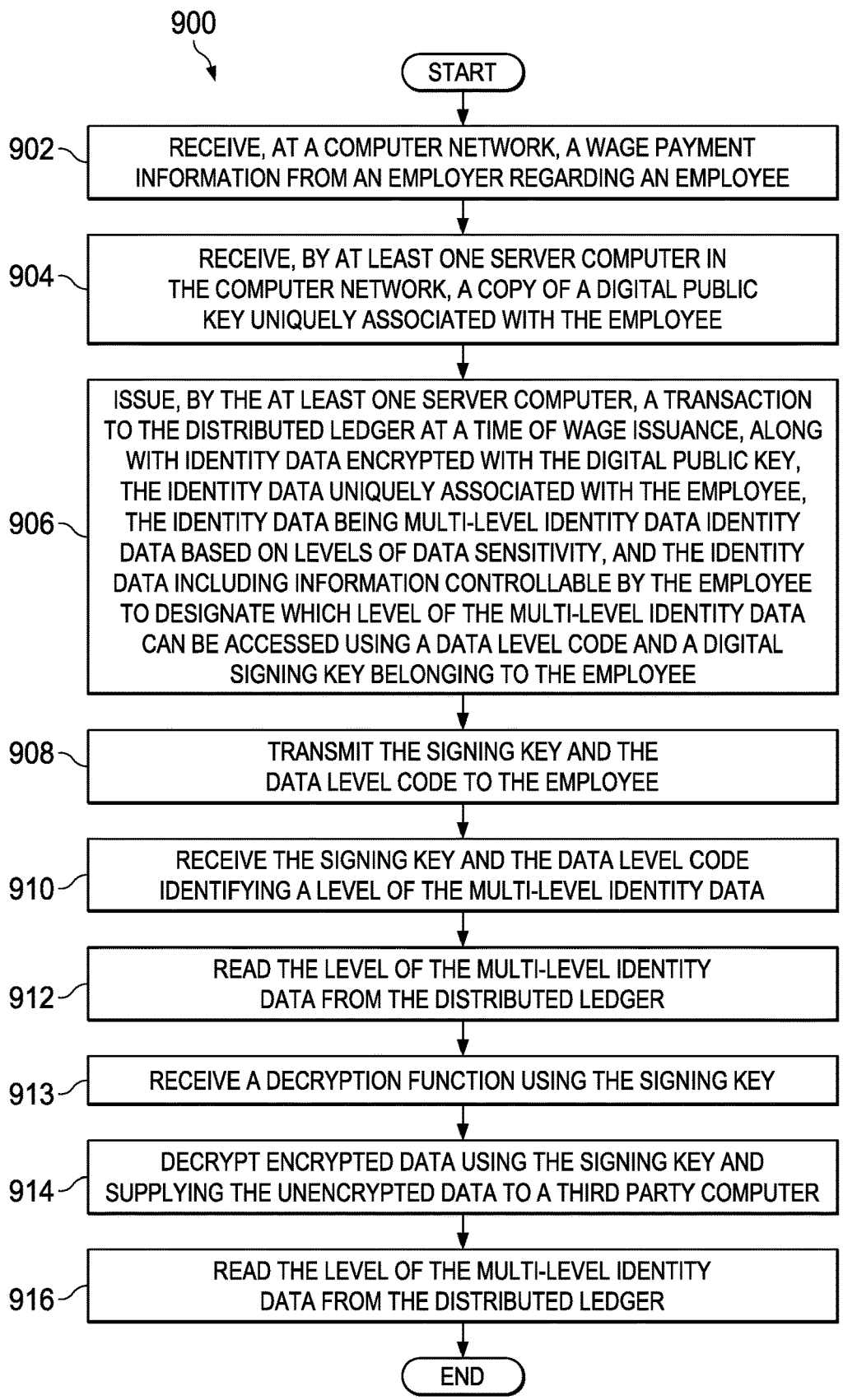
FIG. 9 is a flowchart of a computer-implemented method for using a distributed ledger maintained solely in a computer network in accordance with an illustrative embodiment.

FIG. 9 is a flowchart of a computer-implemented method for using a distributed ledger maintained solely in a computer network in accordance with an illustrative embodiment. FIG. 9 may be implemented on a computer or on multiple computers in a network environment. FIG. 9 addresses a technical problem that only exists in computers, particularly a network-centric system of computers. FIG. 9 is an example of a use for a distributed ledger, including possibly a blockchain, described with respect to FIG. 1 through FIG. 8.

Method 900 may be characterized as a computer-implemented method of using a distributed ledger maintained solely in a computer network. Method 900 includes receiving, at a computer network, a wage payment information from an employer regarding an employee (operation 902). Method 900 also includes receiving, by at least one server computer in the computer network, a copy of a digital public key uniquely associated with the employee (operation 904). Because the public key is publicly available, the at least one server computer may not necessarily receive it from the employer as part of the wage transaction. The employer can point to it, or the at least one server computer can have access to a large database to retrieve the public key or receive it from the employer.

Method 900 also includes issuing, by the at least one server computer, a transaction to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee (operation 906). In an illustrative embodiment, a level of the multi-level identity data of the employee can be made available to a third party upon being identified with the data level code and upon being decrypted with the digital signing key. The data level code is not necessarily an independent input but rather can be used to identify which level of identity data is to be accessed. For example, the multiple levels are pre-coded with a naming convention and knowing the data level code would allow an employee to select which identity data file to use. In one illustrative embodiment, the method may terminate thereafter.

Method 900 may be varied. Optionally, method 900 may include transmitting the signing key and data level codes to the employee (operation 908) so that the employee could use the signing key to decrypt data and the data level codes to identify levels of the multi-level identity data. Optionally, method 900 may include receiving the signing key and the data level code identifying a level of the multi-level identity data (operation 910); and reading the level of the multi-level identity data from the distributed ledger (operation 912), and then receiving a decryption function using the signing key (operation 913). The signing key should remain private with the employee. The data could be decrypted by the signing key without anyone other than the employee having access to the signing key. Optionally, method 900 may include decrypting encrypted data using the signing key and supplying the unencrypted data to a third party computer (operation 914); and reading the level of the multi-level identity data from the distributed ledger (operation 916). The third party may have access to unencrypted data. If encrypted data is stored on the blockchain, a pointer to the encrypted data on the blockchain can be provided and then, using an online decrypting mechanism, an employee could decrypt the data using employee's signing key without exposing the signing key to the third party.

Method 900 may be still further varied. For example, method 900 may include using the identity data and a signing key associated with the public key to verify an identity of the employee. Method 900 may also include using the identity data and encrypting the identity data with the public key of the employer to give an employer control over access permission to the identity data. In this case, method 900 may also include using the identity data and encrypting a certain level of the multi-level identity data with the public key of the employer and subsequently allowing the employer to decrypt the certain level of the multi-level identity data to give the employer control over the certain level of the multi-level identity data.

Method 900 may be varied further still. For example, method 900 may include using the identity data and encrypting a certain level of the multi-level identity data with both the public key of the employer and the public key of the employee and subsequently requiring both the employer and the employee to decrypt the certain level of multi-level identity data to allow a third party access to the certain level of the multi-level identity data.

Method 900 may be varied further still. For example, method 900 may also include associating the identity data with off-chain data about the employee. The off-chain data is stored off the distributed ledger and is stored at a secure location accessible only by the payroll agent or the employer. The off-chain data may be any one of employment history, credentials, skills, appraisals, training, and personal information regarding the employee. Additionally, in this illustrative embodiment, method 900 may also include associating the identity data with additional off-chain data about the employee.

Method 900 may have still other variations. For example, method 900 may also include associating the identity data with biometrics such as fingerprint, finger vein, palm vein, and iris characteristics of the employee. The biometrics information can be stored on the distributed ledger as hash values. In an illustrative embodiment, the distributed ledger may be a blockchain. The term distributed ledger is being used interchangeably as blockchain.

The illustrative embodiments described with respect to FIG. 9 may be still further varied. For example, all of the illustrative embodiments described with respect to FIG. 9 may also be implemented as a computer including a processor and a non-transitory computer recordable storage medium storing computer code which, when executed by the processor, performs the computer-implemented method. Likewise, all of the illustrative embodiments described with respect to FIG. 9 may be implemented as the non-transitory computer recordable storage medium itself. Yet further illustrative embodiments are possible, such as more or fewer operations being present. Thus, the claimed inventions are not necessarily limited by the examples described with respect to FIG. 9.

FIG. 10 is a flowchart of using a distributed ledger implemented solely in a computer network in accordance with an illustrative embodiment. FIG. 10 may be implemented on a computer or on multiple computers in a network environment. FIG. 10 addresses a technical problem that only exists in computers, particularly a network-centric system of computers. FIG. 10 is an example of a use for a distributed ledger, including possibly a blockchain, described with respect to FIG. 1 through FIG. 8. FIG. 10 is a variation of the illustrative embodiments described with respect to FIG. 9.

Method 1000 may be characterized as a method of using a distributed ledger implemented solely in a computer network. Method 1000 may include confirming a digital identity on a blockchain by receiving a decrypted message from an employee wherein the decrypted message is part of the employee's payroll transaction service (operation 1002). In one illustrative embodiment, the method may terminate thereafter.

Optionally, method 1000 may also include encrypting payroll service data regarding an employee using the public key, the payroll service data being stored as hashed data in the distributed ledger (operation 1004). In this case, method 1000 may also include transmitting a signing key, associated with the public key, to the employee (operation 1006). Continuing this example, method 1000 may also include receiving the signing key from a third party (operation 1008); decrypting the payroll service data in the distributed ledger using the signing key (operation 1010); and transmitting the payroll service data to the third party (1012). In one illustrative embodiment, the method may terminate thereafter.

Method 1000 may be still further varied. For example, the payroll service data may be stored in the distributed ledger as a plurality of increasing security levels. In this case, the signing key indicates which level in the plurality of increasing security levels can be accessed.

In another illustrative embodiment, the distributed ledger is a blockchain. In this case, method 1000 may include storing additional on-chain information about the employee. The signing key may identify what part of the additional on-chain information is accessible.

Additionally, for a blockchain, method 1000 may include storing additional off-chain information about the employee. The signing key may decrypt a pointer on the distributed ledger indicating where the additional off-chain information can be found.

The illustrative embodiments described with respect to FIG. 10 may be further varied. For example, all of the illustrative embodiments described with respect to FIG. 10 may also be implemented as a computer including a processor and a non-transitory computer recordable storage medium storing computer code which, when executed by the processor, performs the computer-implemented method. Likewise, all of the illustrative embodiments described with respect to FIG. 10 may be implemented as the non-transitory computer recordable storage medium itself. Yet further illustrative embodiments are possible, such as more or fewer operations being present. Thus, the claimed inventions are not necessarily limited by the examples described with respect to FIG. 10.

FIG. 11 is a flowchart of a method of using a distributed ledger implemented solely in a computer network in accordance with an illustrative embodiment. FIG. 11 may be implemented on a computer or on multiple computers in a network environment. FIG. 11 addresses a technical problem that only exists in computers, particularly a network-centric system of computers. FIG. 11 is an example of a use for a distributed ledger, including possibly a blockchain, described with respect to FIG. 1 through FIG. 8. FIG. 11 is a variation of the illustrative embodiments described with respect to FIG. 9 and FIG. 10.

Method 1100 may be characterized as a computer-implemented method of using a distributed ledger implemented solely in a computer network. Method 1100 may include combining the distributed ledger, a public key infrastructure, and a payroll cloud to provide ongoing verification of a payroll status (operation 1102). In one illustrative embodiment, the method may terminate thereafter.

Method 1100 may be varied. For example, in an illustrative embodiment, the payroll status comprises information describing a payroll history of an employee. In this case, optionally, method 1100 may include encrypting the payroll status using the public key, the payroll status data being stored as hashed data in the distributed ledger (operation 1104). Yet further, this method optionally may include transmitting a signing key, associated with the public key, to the employee (operation 1106).

Still further, method 1100 may include receiving the signing key from a third party (operation 1108); decrypting the payroll status in the distributed ledger using the signing key (operation 1110); and transmitting the payroll status to the third party (1112). In one illustrative embodiment, the method may terminate thereafter.

Method 1100 may be yet further varied. For example, the payroll status may be stored in the distributed ledger as a plurality of increasing security levels. In this case, the signing key indicates which level in the plurality of increasing security levels can be accessed.

In another illustrative embodiment, the distributed ledger comprises a blockchain. In this case, method 1100 may also include storing additional on-chain information about the employee. The signing key may identify what part of the additional on-chain information is accessible.

In yet another illustrative embodiment, method 1100 may include storing additional off-chain information about the employee. In this case, the signing key may decrypt a pointer on the distributed ledger indicating where the additional off-chain information can be found.

The illustrative embodiments described with respect to FIG. 11 may be further varied. For example, all of the illustrative embodiments described with respect to FIG. 11 may also be implemented as a computer including a processor and a non-transitory computer recordable storage medium storing computer code which, when executed by the processor, performs the computer-implemented method. Likewise, all of the illustrative embodiments described with respect to FIG. 11 may be implemented as the non-transitory computer recordable storage medium itself. Yet further illustrative embodiments are possible, such as more or fewer operations being present. Thus, the claimed inventions are not necessarily limited by the examples described with respect to FIG. 11.

Figure 12:
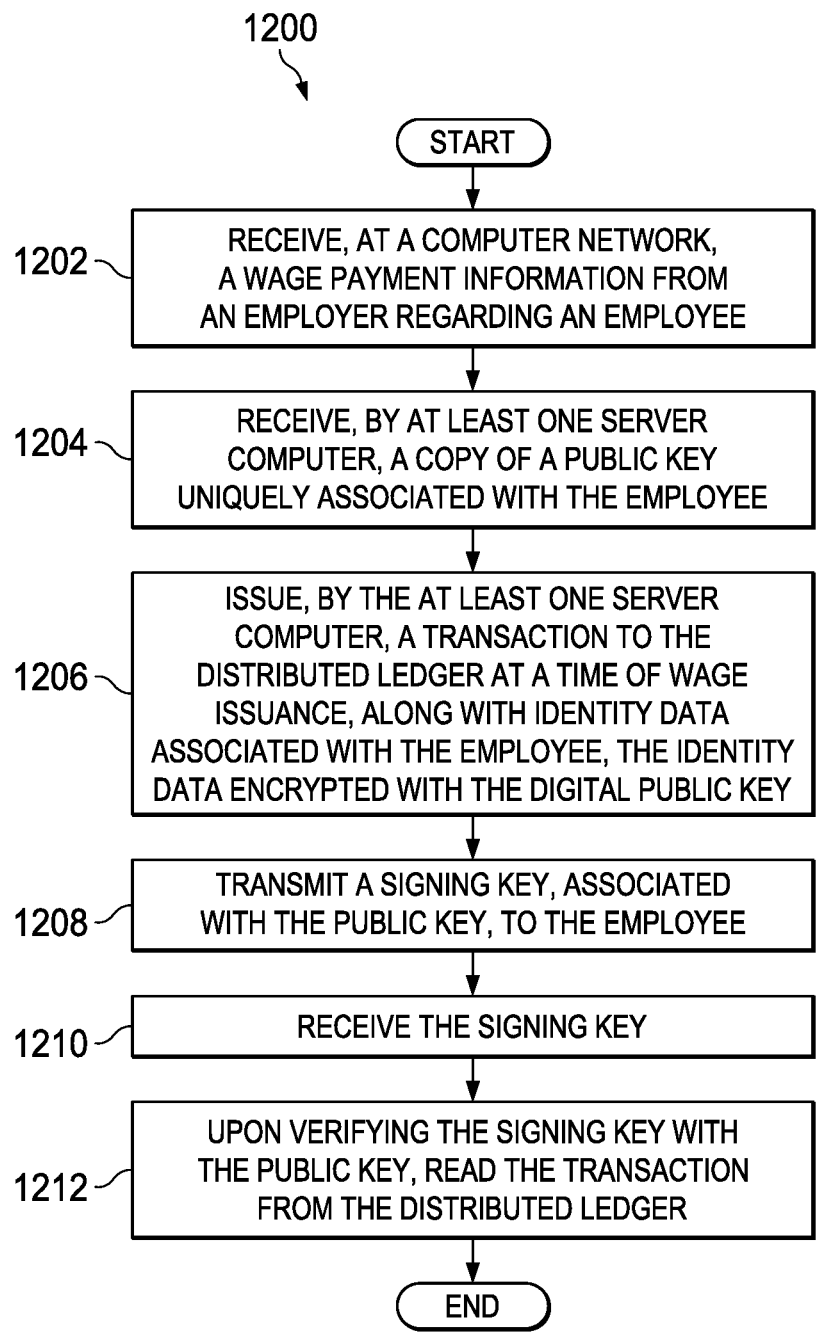
FIG. 12 is a flowchart of a method of using a distributed ledger implemented solely in a computer network in accordance with an illustrative embodiment.

FIG. 12 is a flowchart of a method of using a distributed ledger implemented solely in a computer network in accordance with an illustrative embodiment. FIG. 12 may be implemented on a computer or on multiple computers in a network environment. FIG. 12 addresses a technical problem that only exists in computers, particularly a network-centric system of computers. FIG. 12 is an example of a use for a distributed ledger, including possibly a blockchain, described with respect to FIG. 1 through FIG. 8. FIG. 12 is a variation of the illustrative embodiments described with respect to FIG. 9 through FIG. 11.

Method 1200 may be characterized as a method of using a distributed ledger implemented solely in a computer network. Method 1200 may include receiving, at a computer network, a wage payment information from an employer regarding an employee (operation 1202). Method 1200 may also include receiving, by at least one server computer, a copy of a public key uniquely associated with the employee (operation 1204). Method 1200 may also include issuing, by the at least one server computer, a transaction to the distributed ledger at a time of wage issuance, along with identity data associated with the employee, the identity data encrypted with the digital public key (operation 1206). In one illustrative embodiment, the method may terminate thereafter.

Method 1200 may be varied. For example, optionally method 1200 may also include transmitting a signing key, associated with the public key, to the employee (operation 1208). In this case, method 1200 may also include receiving the signing key (operation 1210); and upon verifying the signing key with the public key, reading the transaction from the distributed ledger (operation 1212). In one illustrative embodiment, the method may terminate thereafter.

However, alternatively, method 1200 could include receiving the signing key; and upon verifying the signing key with the public key, reading the identity data from the distributed ledger. In another illustrative embodiment, method 1200 may include receiving the signing key; and upon verifying the signing key with the public key, reading both the transaction and the identity data from the distributed ledger.

In another variation, the wage payment information contains multi-level identity data with different levels of access. In this case, method 1200 may include transmitting the signing key from a third party computer; and reading a particular level of the multi-level identity data from the distributed ledger based on the signing key. In yet another variation, method 1200 may include using the signing key to give an employer control over access permission to the wage payment information.

In still another illustrative embodiment, the distributed ledger is a blockchain. In this case, method 1200 includes associating the identity data with on-chain data or of-chain data about the employee. The on-chain data or the off-chain data may be any one of employment history, credentials, skills, appraisals, training, and personal information regarding the employee.

The illustrative embodiments described with respect to FIG. 12 may be further varied. For example, all of the illustrative embodiments described with respect to FIG. 12 may also be implemented as a computer including a processor and a non-transitory computer recordable storage medium storing computer code which, when executed by the processor, performs the computer-implemented method. Likewise, all of the illustrative embodiments described with respect to FIG. 12 may be implemented as the non-transitory computer recordable storage medium itself. Yet further illustrative embodiments are possible, such as more or fewer operations being present. Thus, the claimed inventions are not necessarily limited by the examples described with respect to FIG. 12.

Figure 13:
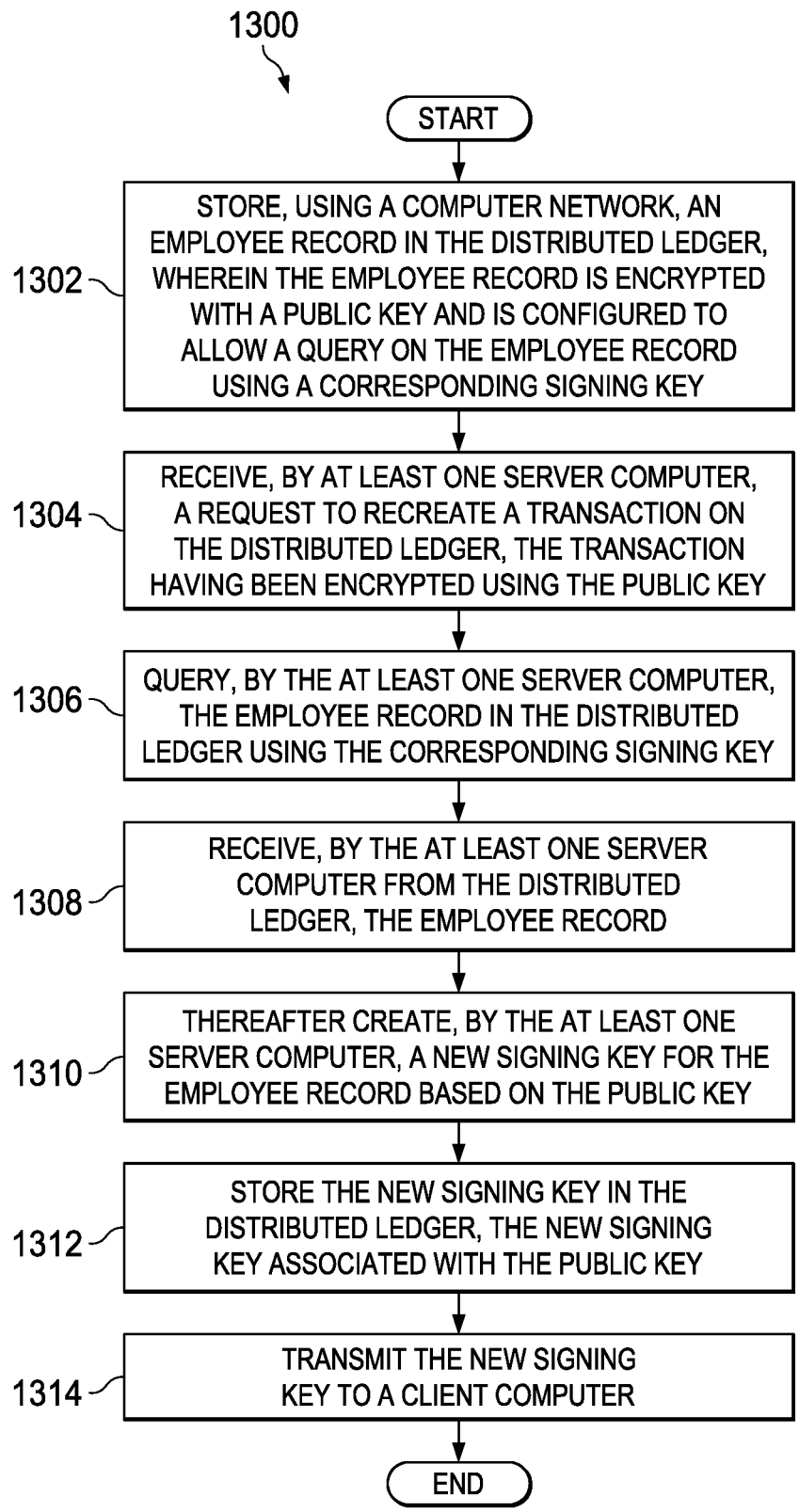
FIG. 13 is a flowchart of a method of recovering encrypted information that is stored in a distributed ledger implemented solely in a computer network in accordance with an illustrative embodiment.

FIG. 13 is a flowchart of a method of recovering encrypted information that is stored in a distributed ledger implemented solely in a computer network in accordance with an illustrative embodiment. FIG. 13 may be implemented on a computer or on multiple computers in a network environment. FIG. 13 addresses a technical problem that only exists in computers, particularly a network-centric system of computers. FIG. 13 is an example of a use for a distributed ledger, including possibly a blockchain, described with respect to FIG. 1 through FIG. 8. FIG. 13 is a variation of the illustrative embodiments described with respect to FIG. 9 through FIG. 12.

Method 1300 may be characterized as a computer-implemented method of recovering encrypted information that is stored in a distributed ledger implemented solely in a computer network. Method 1300 includes storing, using a computer network, an employee record in the distributed ledger, wherein the employee record is encrypted with a public key and is configured to allow a query on the employee record using a corresponding signing key (operation 1302). Method 1300 may also include receiving, by at least one server computer, a request to recreate a transaction on the distributed ledger, the transaction having been encrypted using the public key (operation 1304).

Method 1300 may also include querying, by the at least one server computer, the employee record in the distributed ledger using the corresponding signing key (operation 1306). Method 1300 may also include receiving, by the at least one server computer from the distributed ledger, the employee record (operation 1308). Method 1300 may also include thereafter creating, by least one server computer, a new signing key for the employee record based on the public key (operation 1310).

Method 1300 may also include storing the new signing key in the distributed ledger, the new signing key associated with the public key (operation 1312). Method 1300 may also include transmitting the new signing key to a client computer (operation 1314). In one illustrative embodiment, the method may terminate thereafter.

Method 1300 may be varied. For example, method 1300 may further include, prior to receiving the request to recreate the transaction, receiving, by the at least one server computer, a notification that one of the public key and the signing key have been compromised. In another illustrative embodiment, method 1300 may include receiving, by the at least one server computer, the new signing key from a client computer; querying, by the at least one server computer, the employee record in the distributed ledger using the new signing key; and transmitting, by the at least one server computer, the employee record to the client computer.

In still another illustrative embodiment, the distributed ledger may be a blockchain. In this case, method 1300 may also include storing additional data on-chain, the additional data associated with the employee record; receiving the new signing key; and retrieving the additional data along with the employee record. In this illustrative embodiment, the additional data comprises any one of employment history, credentials, skills, appraisals, training, and personal information regarding the employee.

In yet a different illustrative embodiment, again the distributed ledger may be a blockchain. In this case, method 1300 may also include storing additional data off-chain, the additional data associated with the employee record; receiving the new signing key; retrieving a pointer in the employee record, the pointer pointing to the additional data that is stored off-chain; and accessing, using the pointer, the additional data. The additional data may be any one of employment history, credentials, skills, appraisals, training, and personal information regarding the employee. Other information could also be stored for this and the other illustrative embodiments described elsewhere herein.

The illustrative embodiments described with respect to FIG. 13 may be further varied. For example, all of the illustrative embodiments described with respect to FIG. 13 may also be implemented as a computer including a processor and a non-transitory computer recordable storage medium storing computer code which, when executed by the processor, performs the computer-implemented method. Likewise, all of the illustrative embodiments described with respect to FIG. 13 may be implemented as the non-transitory computer recordable storage medium itself. Yet further illustrative embodiments are possible, such as more or fewer operations being present. Thus, the claimed inventions are not necessarily limited by the examples described with respect to FIG. 13.

Figure 14:
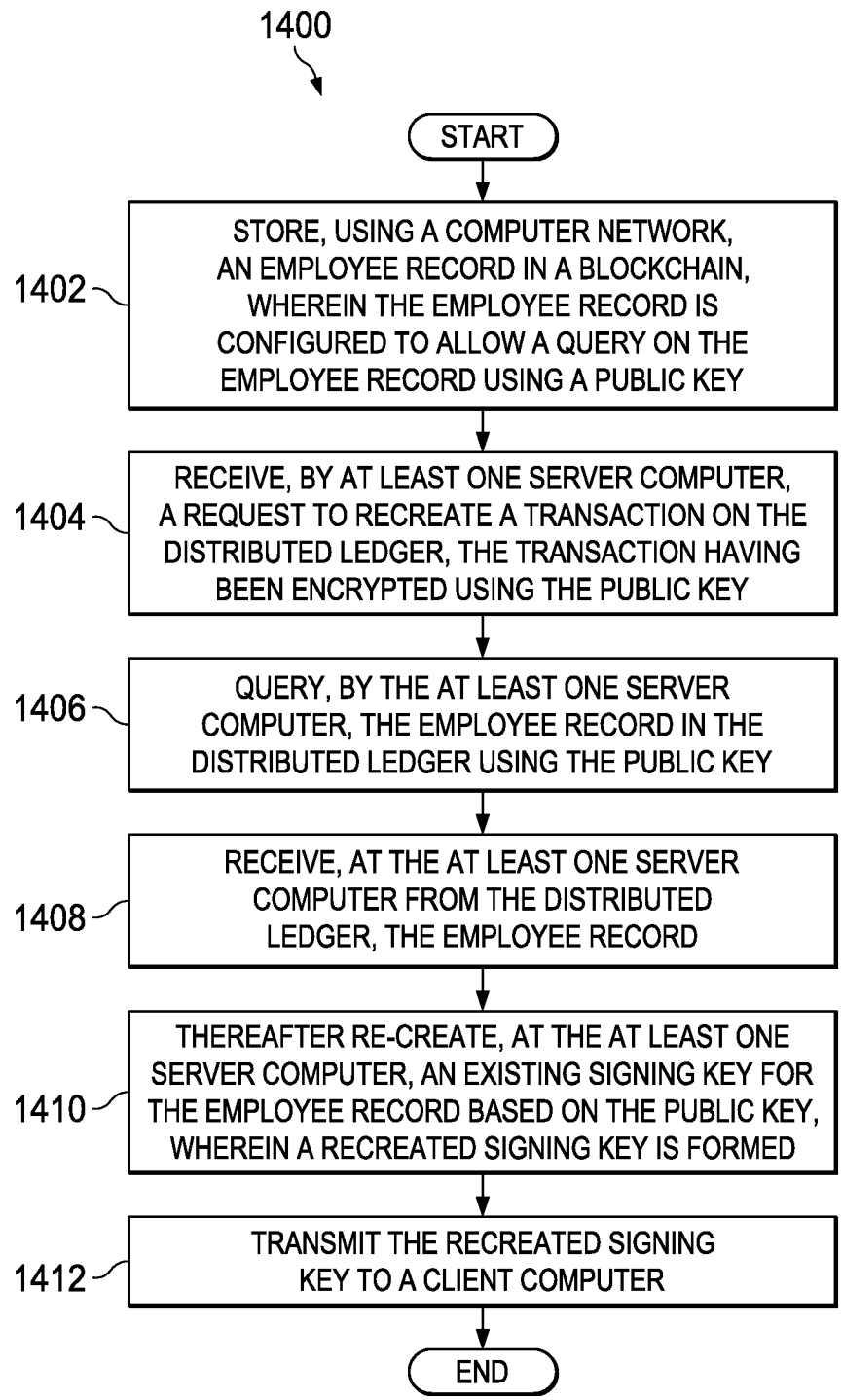
FIG. 14 is a flowchart of a method of recovering encrypted information that is stored in a distributed ledger implemented solely in a computer network in accordance with an illustrative embodiment.

FIG. 14 is a flowchart of a method of recovering encrypted information that is stored in a distributed ledger implemented solely in a computer network in accordance with an illustrative embodiment. FIG. 14 may be implemented on a computer or on multiple computers in a network environment. FIG. 14 addresses a technical problem that only exists in computers, particularly a network-centric system of computers. FIG. 14 is an example of a use for a distributed ledger, including possibly a blockchain, described with respect to FIG. 1 through FIG. 8. FIG. 14 is a variation of the illustrative embodiments described with respect to FIG. 9 through FIG. 13.

Method 1400 may be characterized as a method of recovering encrypted information that is stored in a distributed ledger implemented solely in a computer network. Method 1400 may include storing, using a computer network, an employee record in a blockchain, wherein the employee record is configured to allow a query on the employee record using a public key (operation 1402). Method 1400 may also include receiving, by at least one server computer, a request to recreate a transaction on the distributed ledger, the transaction having been encrypted using the public key (operation 1404).

Method 1400 may also include querying, by the at least one server computer, the employee record in the distributed ledger using the public key (operation 1406). Method 1400 may also include receiving, at the at least one server computer from the distributed ledger, the employee record (operation 1408).

Method 1400 may also include thereafter re-creating, at the at least one server computer, an existing signing key for the employee record based on the public key, wherein a recreated signing key is formed (operation 1410). Method 1400 may also include transmitting the recreated signing key to a client computer (operation 1412). In one illustrative embodiment, the method may terminate thereafter.

Method 1400 may be varied. For example, method 1400 may also include, prior to receiving the request to recreate the transaction, receiving, at a computer network, a notification that one of the public key and the signing key have been compromised. In another illustrative embodiment, method 1400 may also include receiving, by at least one server computer, the new signing key from a client computer; querying, by the at least one server computer, the employee record in the distributed ledger using the new signing key; and transmitting, by the at least one server computer, the employee record to the client computer.

In yet another illustrative embodiment the distributed ledger may be a blockchain. In this case, method 1400 may include storing additional data off-blockchain, the additional data associated with the employee record; receiving the new signing key; and retrieving the additional data along with the employee record. The additional data comprises any one of employment history, credentials, skills, appraisals, training, and personal information regarding the employee, or other types of data.

In an illustrative embodiment, off-chain storage may operate as follows. The blockchain may store a SHA-256 hash of the data as a pointer but routes a third party to an off-blockchain key-value store. In other words, when one accesses the pointer (hash) on the blockchain, it will lead to actual data in a secure location (along with permission).

The off-blockchain key value storage is an implementation of KADEMILIA®, a distributed hash table (or DHT) with added persistence using LevelDB2 and an interface to the blockchain. The DHT is maintained by a network of nodes (possibly disjointed from the blockchain network), which fulfill approved read/write transactions. Data are sufficiently randomized across the nodes and replicated to ensure high availability.

Alternative off-blockchain solutions could also be considered for storage. For example, a centralized cloud could be used to store data. While this option requires some amount of trust in a third party, it has some advantages in terms of scalability and ease of deployment.

In still another illustrative embodiment, the distributed ledger is also a blockchain, but in this case, method 1400 includes storing additional data off-chain, the additional data associated with the employee record; receiving the new signing key; retrieving a pointer in the employee record, the pointer pointing to the additional data that is stored off-chain; and accessing, using the pointer, the additional data. The additional data, again, may be any one of employment history, credentials, skills, appraisals, training, and personal information regarding the employee, or other types of data.

The illustrative embodiments described with respect to FIG. 14 may be further varied. For example, all of the illustrative embodiments described with respect to FIG. 14 may also be implemented as a computer including a processor and a non-transitory computer recordable storage medium storing computer code which, when executed by the processor, performs the computer-implemented method. Likewise, all of the illustrative embodiments described with respect to FIG. 14 may be implemented as the non-transitory computer recordable storage medium itself. Yet further illustrative embodiments are possible, such as more or fewer operations being present. Thus, the claimed inventions are not necessarily limited by the examples described with respect to FIG. 14.

Figure 15:
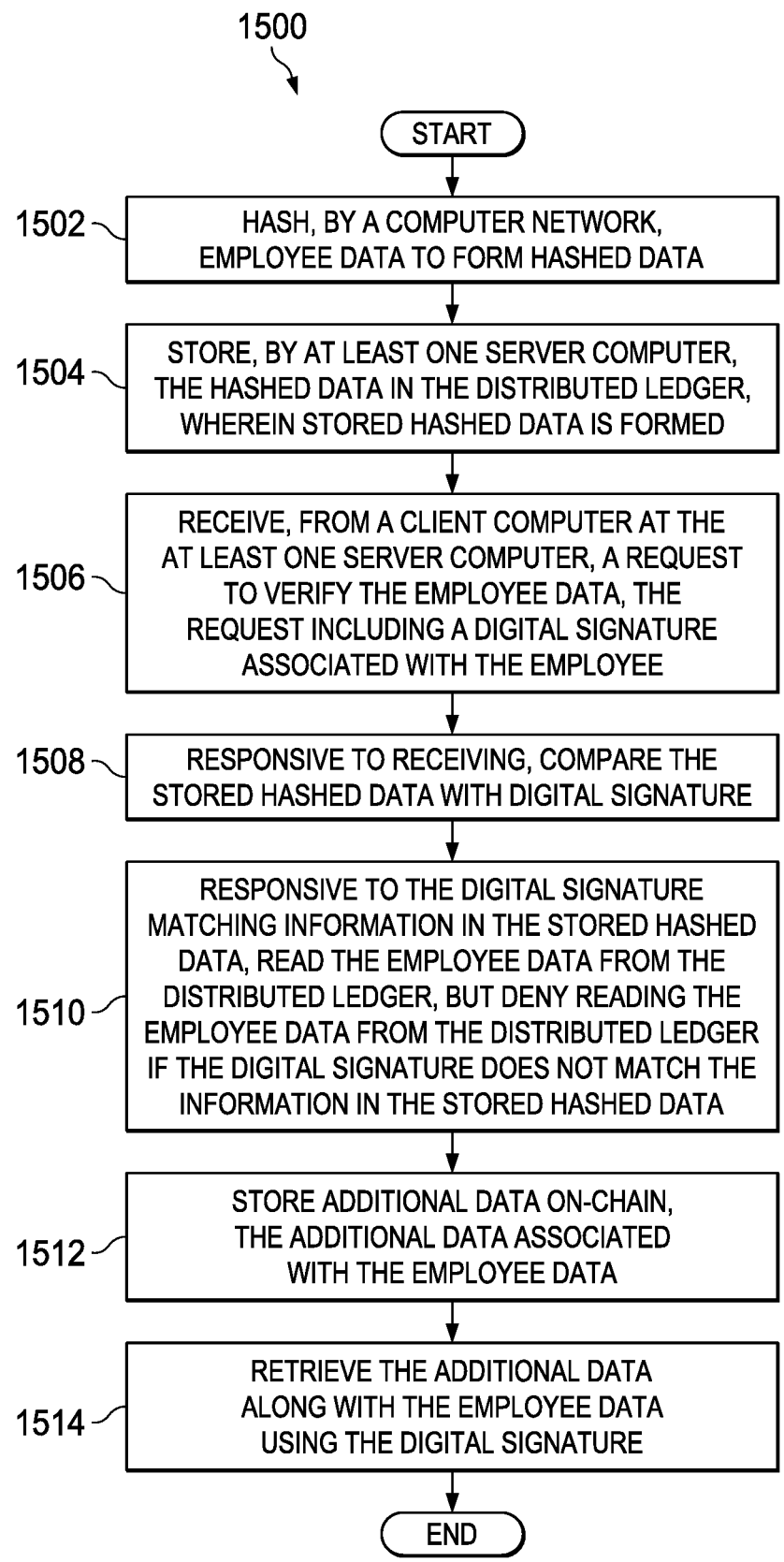
FIG. 15 is a flowchart of a method of verifying employee data of an employee, the employee data stored on a distributed ledger implemented solely in a computer network in accordance with an illustrative embodiment.

FIG. 15 is a flowchart of a method of verifying employee data of an employee, the employee data stored on a distributed ledger implemented solely in a computer network in accordance with an illustrative embodiment. FIG. 15 may be implemented on a computer or on multiple computers in a network environment. FIG. 15 addresses a technical problem that only exists in computers, particularly a network-centric system of computers. FIG. 15 is an example of a use for a distributed ledger, including possibly a blockchain, described with respect to FIG. 1 through FIG. 8. FIG. 15 is a variation of the illustrative embodiments described with respect to FIG. 9 through FIG. 14.

Method 1500 may be characterized as a computer-implemented method of verifying employee data of an employee, the employee data stored on a distributed ledger implemented solely in a computer network. Method 1500 may include hashing, by a computer network, employee data to form hashed data (operation 1502). Method 1500 may also include storing, by at least one server computer, the hashed data in the distributed ledger, wherein stored hashed data is formed (operation 1504).

Method 1500 may also include receiving, from a client computer at the at least one server computer, a request to verify the employee data, the request including a digital signature associated with the employee (operation 1506). Method 1500 may also include, responsive to receiving, comparing the stored hashed data with digital signature (operation 1508). Method 1500 may also include, responsive to the digital signature matching information in the stored hashed data, reading the employee data from the distributed ledger, but denying reading the employee data from the distributed ledger if the digital signature does not match the information in the stored hashed data (operation 1510). In one illustrative embodiment, the method may terminate thereafter.

Method 1500 may be varied. For example, the employee data may be stored in security layers associated with different digital signatures, and wherein the digital signature contains security data identifying a level of access to the security layers. In another example, the employee data may be a smart contract. In still another example, the employee data is further encrypted using a public key. The digital signature further includes a signing key associated with the public key such that the digital signature allows decryption of the employee data.

Other variations are also possible. For example, the distributed ledger may be a blockchain. In this case, optionally, method 1500 may include storing additional data on-chain, the additional data associated with the employee data (operation 1512); and retrieving the additional data along with the employee data using the digital signature (operation 1514). Again, in one illustrative embodiment, the method may terminate thereafter.

Yet further illustrative embodiments are possible. For example, as above, the additional data comprises any one of employment history, credentials, skills, appraisals, training, and personal information regarding the employee, or other types of data. The additional data may be stored in multiple security layers associated with different digital signatures, and wherein the digital signature contains security data identifying a level of access to the security layers.

The employee data is stored in security layers associated with different digital signatures. The digital signature may contain security data identifying a level of access to the security layers. The additional data may be stored in the multiple security layers. The digital signature may contain security data identifying a level of access to the security layers for both the employee data and the additional data. In yet another illustrative embodiment, the digital signature may contain different levels of access to the employee data and the additional data.

Additional operations may be present for method 1500. for example, when the distributed ledger comprises a blockchain, method 1500 may also include storing additional data off-chain, the additional data associated with the employee record; storing a pointer in the employee data, the pointer pointing to the additional data that is stored off-chain; responsive to the digital signature matching information in the stored hashed data, reading the pointer from the distributed ledger; and using the pointer to retrieve the additional data stored off-chain.

The illustrative embodiments described with respect to FIG. 15 may be further varied. For example, all of the illustrative embodiments described with respect to FIG. 15 may also be implemented as a computer including a processor and a non-transitory computer recordable storage medium storing computer code which, when executed by the processor, performs the computer-implemented method. Likewise, all of the illustrative embodiments described with respect to FIG. 15 may be implemented as the non-transitory computer recordable storage medium itself. Yet further illustrative embodiments are possible, such as more or fewer operations being present. Thus, the claimed inventions are not necessarily limited by the examples described with respect to FIG. 15.

Figure 16:
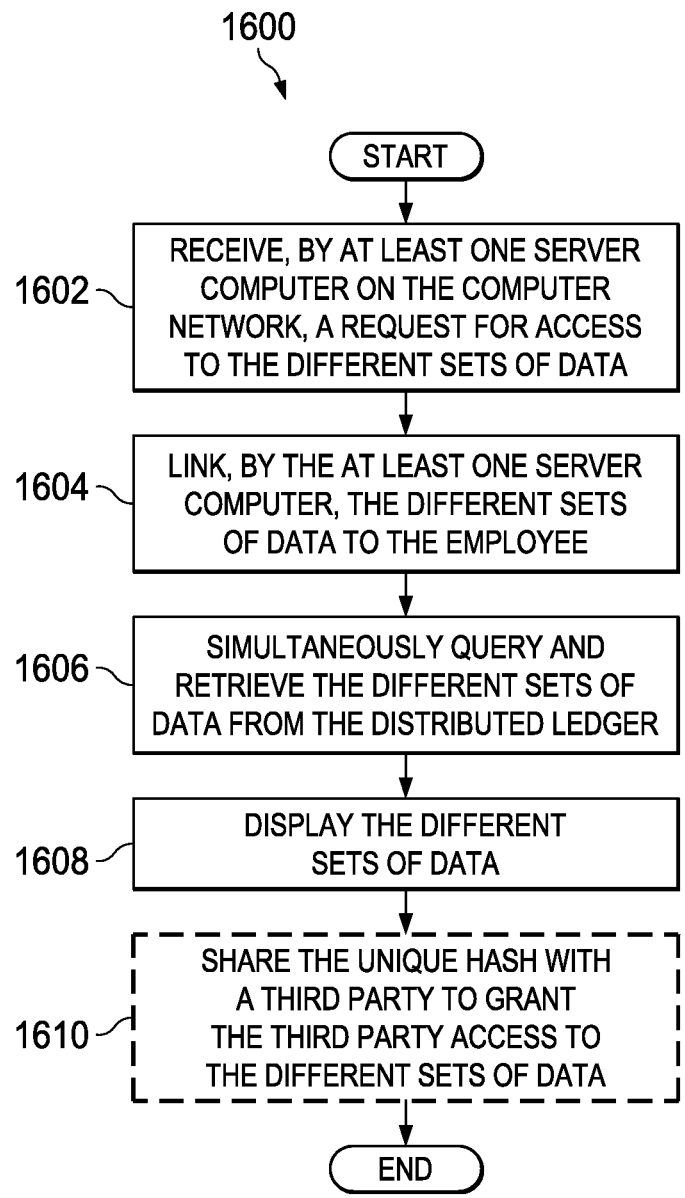
FIG. 16 is a flowchart of a method of using a distributed ledger maintained solely in a computer network to increase the efficiency and security of retrieval of data related to an employee having multiple, different sets of data for which different signing key and verification key pairs apply, in accordance with an illustrative embodiment.

FIG. 16 is a flowchart of a method of using a distributed ledger maintained solely in a computer network to increase the efficiency and security of retrieval of data related to an employee having multiple, different sets of data for which different signing key and verification key pairs apply, in accordance with an illustrative embodiment. FIG. 16 may be implemented on a computer or on multiple computers in a network environment. FIG. 16 addresses a technical problem that only exists in computers, particularly a network-centric system of computers. FIG. 16 is an example of a use for a distributed ledger, including possibly a blockchain, described with respect to FIG. 1 through FIG. 8. FIG. 16 is a variation of the illustrative embodiments described with respect to FIG. 9 through FIG. 15.

Method 1600 may be characterized as a computer-implemented method of using a distributed ledger maintained solely in a computer network to increase the efficiency and security of retrieval of data related to an employee having multiple, different sets of data for which different signing key and verification key pairs apply. Method 1600 includes receiving, by at least one server computer on the computer network, a request for access to the different sets of data (operation 1602). Method 1600 also includes linking, by the at least one server computer, the different sets of data to the employee (operation 1604). Method 1600 also includes simultaneously querying and retrieving the different sets of data from the distributed ledger (operation 1606). Method 1600 also includes displaying the different sets of data (operation 1608). In one illustrative embodiment, method 1600 may terminate thereafter.

Method 1600 may be varied. For example, linking the different sets of data to the employee may include: prior to receiving, hashing personal information of the employee to form a unique hash associated with the employee; and performing simultaneously querying and retrieving by using the unique hash for querying, and wherein the unique hash is identical for all of the different singing key and verification key pairs. In this case, the unique hash may be performed under a SHA-256 hashing algorithm. The personal information may be a hash of two or more of a social security number of the employee, a name of the employee, a birthdate of the employee, a driver's license number of the employee, a professional license number of the employee, a telephone number of the employee, an address of the employee, and any other information directly associated with the employee.

Method 1600 may be further varied. For example, in an illustrative embodiment the distributed ledger comprises a blockchain. In another illustrative embodiment, method 1600 optionally may also include sharing the unique hash with a third party to grant the third party access to the different sets of data (operation 1610). Sharing may be performed by a client computer at a request of the employee.

The illustrative embodiments described with respect to FIG. 16 may be further varied. For example, all of the illustrative embodiments described with respect to FIG. 16 may also be implemented as a computer including a processor and a non-transitory computer recordable storage medium storing computer code which, when executed by the processor, performs the computer-implemented method. Likewise, all of the illustrative embodiments described with respect to FIG. 16 may be implemented as the non-transitory computer recordable storage medium itself. Yet further illustrative embodiments are possible, such as more or fewer operations being present. Thus, the claimed inventions are not necessarily limited by the examples described with respect to FIG. 16.

Figure 17:
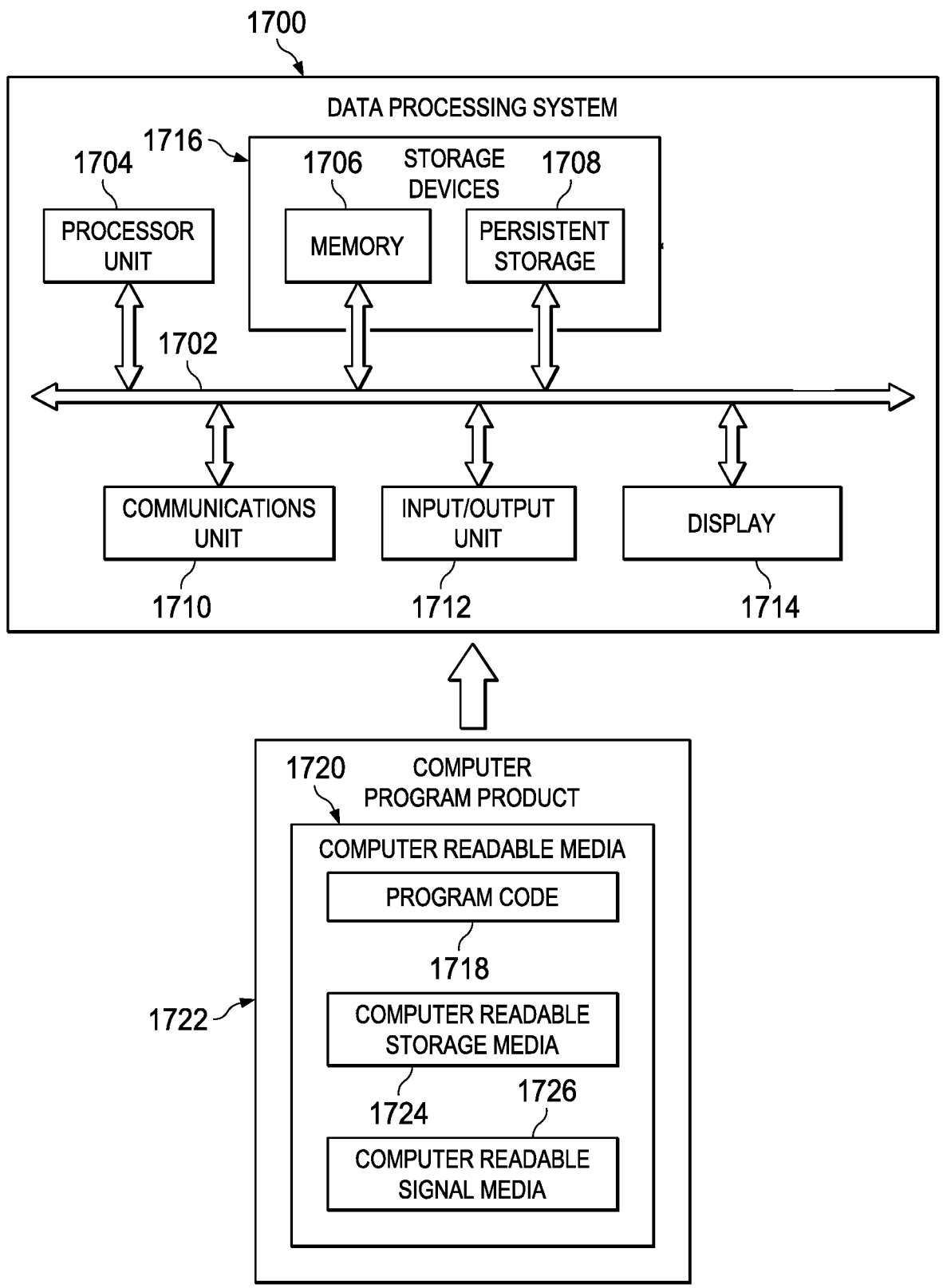
FIG. 17 is a block diagram of a data processing system, in accordance with an illustrative embodiment.

FIG. 17 is a block diagram of a data processing system depicted in accordance with an illustrative embodiment. Data processing system 1700 is an example of a computer that may be used to implement any of the illustrative embodiments described with respect to FIG. 1 through FIG. 16.

In this illustrative example, data processing system 1700 includes communications framework 1702, which provides communications between processor unit 1704, memory 1706, persistent storage 1708, communications unit 1710, input/output unit 1712, and display 1714. In this example, communication framework may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software on a non-transitory computer recordable storage medium usable to implement any of the illustrative embodiments described above. Storage devices 1716 may also be referred to as computer-readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer-usable program code, or computer-readable program code that may be read and executed by a processor in processor unit 1704. The program code in the different embodiments may be embodied on different physical or computer-readable storage media, such as memory 1706 or persistent storage 1708.

Program code 1718 is located in a functional form on computer-readable media 1720 that is selectively removable and may be loaded onto or transferred to data processing system 1700 for execution by processor unit 1704. Program code 1718 and computer-readable media 1720 form computer program product 1722 in these illustrative examples. In one example, computer-readable media 1720 may be computer-readable storage media 1724 or computer-readable signal media 1726.

In these illustrative examples, computer-readable storage media 1724 is a physical or tangible storage device used to store program code 1718 rather than a medium that propagates or transmits program code 1718.

Alternatively, program code 1718 may be transferred to data processing system 1700 using computer-readable signal media 1726. Computer-readable signal media 1726 may be, for example, a propagated data signal containing program code 1718. For example, computer-readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components, in addition to or in place of those illustrated for data processing system 1700. Other components shown in FIG. 17 can be varied from the illustrative examples shown. The different embodiments may be implemented using any hardware device or system capable of running program code 1718.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

As used herein, the term "server computer" is any computer which operates in the role of a server, whether or not the computer is configured specifically to operate as a "server." As used herein, the term "client computer" is any computer which operates in the roll of a client, whether or not the computer is configured specifically to operate as a "client" or a "workstation."

The following are considered embodiments of the disclosure. These embodiments are not exclusive; other embodiments are possible.

1. A computer-implemented method of using a distributed ledger maintained solely in a computer network, the computer-implemented method comprising:
   receiving, at a computer network, a wage payment information from an employer regarding an employee;
   receiving, by at least one server computer, a copy of a digital public key uniquely associated with the employee; and
   issuing, by the at least one server computer, a transaction to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee;
   wherein a level of the multi-level identity data of the employee can be made available to a third party upon being identified with the data level code and upon being decrypted with the digital signing key.

2. The computer-implemented method of claim 1 further comprising:
   transmitting the signing key and the data level code to the employee.

3. The computer-implemented method of claim 1 further comprising:
   receiving the signing key and the data level code identifying a level of the multi-level identity data; and
   reading the level of the multi-level identity data from the distributed ledger.

4. The computer-implemented method of claim 3 further comprising:
   receive a decryption function using the signing key;
   decrypting encrypted data using the signing key; and
   supplying the unencrypted data to a third party.

5. The computer-implemented method of claim 1 further comprising:
   using the identity data and a signing key associated with the public key to verify an identity of the employee.

6. The computer-implemented method of claim 1 further comprising:
   using the identity data and encrypting the identity data with the public key of the employer to give an employer control over access permission to the identity data 7. The computer-implemented method of claim 6 further comprising:
   using the identity data and encrypting a certain level of the multi-level identity data with the public key of the employer and subsequently allowing the employer to decrypt the certain level of the multi-level identity data to give the employer control over the certain level of the multi-level identity data.

8. The computer-implemented method of claim 1 further comprising:
   associating the identity data with biometrics about the employee.

9. The computer-implemented method of claim 8 wherein the on-chain data comprises any one of employment history, credentials, skills, appraisals, training, and personal information regarding the employee.

10. The computer-implemented method of claim 8 further comprising:
associating the identity data with additional off-chain data about the employee.

11. The computer-implemented method of claim 10 wherein the additional off-chain data comprises any one of employment history, credentials, skills, appraisals, training, and personal information regarding the employee.

12. The computer-implemented method of claim 1 further comprising:
associating the identity data with off-chain data about the employee.

13. The computer-implemented method of claim 12 wherein the off-chain data comprises any one of employment history, credentials, skills, appraisals, training, and personal information regarding the employee.

14. The computer-implemented method of claim 1 wherein the distributed ledger comprises a blockchain.

15. A computer comprising:
a processor; and
a non-transitory computer recordable storage medium in communication with the processor and storing computer code which, when implemented by the processor, implements a computer-implemented method of using a distributed ledger maintained solely in a computer network, the computer code comprising:
computer code for receiving, at a computer network, a wage payment information from an employer regarding an employee;
computer code for receiving, by at least one server computer, a copy of a digital public key uniquely associated with the employee; and
computer code for issuing, by the at least one server computer, a transaction to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee;
wherein the computer code includes additional code such that a level of the multi-level identity data of the employee can be made available to a third party upon being identified with the data level code and upon being decrypted with the digital signing key.

16. The computer of claim 15 wherein the computer code further comprises:
computer code for transmitting the signing key and the data level code to the employee.

17. The computer of claim 15 wherein the computer code further comprises:
computer code for receiving the signing key and the data level code identifying a level of the multi-level identity data; and
computer code for reading the level of the multi-level identity data from the distributed ledger.

18. A non-transitory computer recordable storage medium storing computer code which, when implemented by a processor, implements a computer-implemented method of using a distributed ledger maintained solely in a computer network, the computer code comprising:
computer code for receiving, at a computer network, a wage payment information from an employer regarding an employee;
computer code for receiving, by at least one server computer, a copy of a digital public key uniquely associated with the employee; and
computer code for issuing, by the at least one server computer, a transaction to the distributed ledger at a time of wage issuance, along with identity data encrypted with the digital public key, the identity data uniquely associated with the employee, the identity data being multi-level identity data based on levels of data sensitivity, and the identity data including information controllable by the employee to designate which level of the multi-level identity data can be accessed using a data level code and a digital signing key belonging to the employee;
wherein the computer code includes additional code such that a level of the multi-level identity data of the employee can be made available to a third party upon being identified with the data level code and upon being decrypted with the digital signing key.

19. The non-transitory computer recordable storage medium of claim 18 wherein the computer code further comprises:
computer code for transmitting the signing key and the data level code to the employee.

20. The non-transitory computer recordable storage medium of claim 18 wherein the computer code further comprises:
computer code for receiving the signing key and the data level code identifying a level of the multi-level identity data; and
computer code for reading the level of the multi-level identity data from the distributed ledger.

1. A computer-implemented method of using a distributed ledger implemented solely in a computer network, the computer-implemented method comprising:
combining the distributed ledger, a public key infrastructure, and a payroll cloud to provide remote identify proofing for a payroll service.

2. The computer-implemented method of claim 1 further comprising:
encrypting payroll service data regarding an employee using the public key, the payroll service data being stored as hashed data in the distributed ledger.

3. The computer-implemented method of claim 2 further comprising:
transmitting a signing key, associated with the public key, to the employee.

4. The computer-implemented method of claim 3 further comprising:
receiving the signing key from a third party;
decrypting the payroll service data in the distributed ledger using the signing key; and
transmitting the payroll service data to the third party.

5. The computer-implemented method of claim 3 wherein the payroll service data is stored in the distributed ledger as a plurality of increasing security levels, and wherein the signing key indicates which level in the plurality of increasing security levels can be accessed.

6. The computer-implemented method of claim 3 wherein the distributed ledger comprises a blockchain.

7. The computer-implemented method of claim 6 further comprising:
storing additional on-chain information about the employee.

8. The computer-implemented method of claim 7 wherein the signing key identifies what part of the additional on-chain information is accessible.

9. The computer-implemented method of claim 6 further comprising:
   storing additional off-chain information about the employee.
10. The computer-implemented method of claim 9 wherein the signing key decrypts a pointer on the distributed ledger indicating where the additional off-chain information can be found.
11. A computer-implemented method of using a distributed ledger implemented solely in a computer network, the computer-implemented method comprising:
   combining the distributed ledger, a public key infrastructure, and a payroll cloud to provide ongoing verification of a payroll status.
12. The computer-implemented method of claim 11 wherein the payroll status comprises information describing a payroll history of an employee, and wherein the method further comprises:
   encrypting the payroll status using the public key, the payroll status data being stored as hashed data in the distributed ledger.
13. The computer-implemented method of claim 12 further comprising:
   transmitting a signing key, associated with the public key, to the employee.
14. The computer-implemented method of claim 13 further comprising:
   receiving the signing key from a third party;
   decrypting the payroll status in the distributed ledger using the signing key; and
   transmitting the payroll status to the third party.
15. The computer-implemented method of claim 13 wherein the payroll status is stored in the distributed ledger as a plurality of increasing security levels, and wherein the signing key indicates which level in the plurality of increasing security levels can be accessed.
16. The computer-implemented method of claim 13 wherein the distributed ledger comprises a blockchain.
17. The computer-implemented method of claim 16 further comprising:
   storing additional on-chain information about the employee.
18. The computer-implemented method of claim 17 wherein the signing key identifies what part of the additional on-chain information is accessible.
19. The computer-implemented method of claim 16 further comprising:
   storing additional off-chain information about the employee.
20. The computer-implemented method of claim 19 wherein the signing key decrypts a pointer on the distributed ledger indicating where the additional off-chain information can be found.
1. A computer-implemented method of using a distributed ledger implemented solely in a computer network, the computer-implemented method comprising:
   receiving, at a computer network, a wage payment information from an employer regarding an employee;
   receiving, by at least one server computer, a copy of a public key uniquely associated with the employee; and
   issuing, by the server at least one computer, a transaction to the distributed ledger at a time of wage issuance, along with identity data associated with the employee, the identity data encrypted with the digital public key.

2. The computer-implemented method of claim 1 further comprising:
   transmitting a signing key, associated with the public key, to the employee.
3. The computer-implemented method of claim 2 further comprising:
   receiving the signing key; and
   upon verifying the signing key with the public key, reading the transaction from the distributed ledger.
4. The computer-implemented method of claim 2 further comprising:
   receiving the signing key; and
   upon verifying the signing key with the public key, reading the identity data from the distributed ledger.
5. The computer-implemented method of claim 2 further comprising:
   receiving the signing key; and
   upon verifying the signing key with the public key, reading both the transaction and the identity data from the distributed ledger.
6. The computer-implemented method of claim 1, wherein the wage payment information contains multi-level identity data with different levels of access.
7. The computer-implemented method of claim 6 further comprising:
   transmitting the signing key from a third party computer; and
   reading a particular level of the multi-level identity data from the distributed ledger based on the signing key.
8. The computer-implemented method of claim 1 further comprising:
   using the signing key to give an employer control over access permission to the wage payment information.
9. The computer-implemented method of claim 1, wherein the distributed ledger comprises a blockchain, and further comprising:
   associating the identity data with on-chain data or off-chain data about the employee.
10. The computer-implemented method of claim 9 wherein the on-chain data or the off-chain data comprises any one of employment history, credentials, skills, appraisals, training, and personal information regarding the employee.
11. A computer comprising:
   a processor; and
   a non-transitory computer recordable storage medium in communication with the processor and storing computer code which, when implemented by the processor, implements a computer-implemented method of using a distributed ledger implemented solely in a computer network, the computer code comprising:
   computer code for receiving, at a computer network, a wage payment information from an employer regarding an employee;
   computer code for receiving, by at least one server computer, a copy of a public key uniquely associated with the employee; and
   computer code for issuing, by the at least one server computer, a transaction to the distributed ledger at a time of wage issuance, along with identity data associated with the employee, the identity data encrypted with the digital public key.
12. The computer of claim 11, wherein the computer code further comprises:
   computer code for transmitting a signing key, associated with the public key, to the employee.

13. The computer of claim 12 wherein the computer code further comprises:
   computer code for receiving the signing key; and
   computer code for upon verifying the signing key with the public key, reading the transaction from the distributed ledger.

14. The computer of claim 12 wherein the computer code further comprises:
   computer code for receiving the signing key; and
   computer code for upon verifying the signing key with the public key, reading the identity data from the distributed ledger.

15. The computer of claim 12 wherein the computer code further comprises:
   computer code for receiving the signing key; and
   computer code for upon verifying the signing key with the public key, reading both the transaction and the identity data from the distributed ledger.

16. A non-transitory computer recordable storage medium storing computer code which, when executed by a processor, performs a computer-implemented method of using a distributed ledger implemented solely in a computer network, the computer code comprising:
   computer code for receiving, at a computer network, a wage payment information from an employer regarding an employee;
   computer code for receiving, by at least one server computer, a copy of a public key uniquely associated with the employee; and
   computer code for issuing, by the at least one server computer, a transaction to the distributed ledger at a time of wage issuance, along with identity data associated with the employee, the identity data encrypted with the digital public key.

17. The non-transitory computer recordable storage medium of claim 16, wherein the computer code further comprises:
   computer code for transmitting a signing key, associated with the public key, to the employee.

18. The non-transitory computer recordable storage medium of claim 17, wherein the computer code further comprises:
   computer code for receiving the signing key; and
   computer code for upon verifying the signing key with the public key, reading the transaction from the distributed ledger.

19. The non-transitory computer recordable storage medium of claim 17, wherein the computer code further comprises:
   computer code for receiving the signing key; and
   computer code for upon verifying the signing key with the public key, reading the identity data from the distributed ledger.

20. The non-transitory computer recordable storage medium of claim 17, wherein the computer code further comprises:
   computer code for receiving the signing key; and
   computer code for upon verifying the signing key with the public key, reading both the transaction and the identity data from the distributed ledger.

1. A computer-implemented method of recovering encrypted information that is stored in a distributed ledger implemented solely in a computer network, the computer-implemented method comprising:
   storing, using at least one server computer, an employee record in the distributed ledger, wherein the employee record is encrypted with a public key and is configured to allow a query on the employee record using a corresponding signing key;
   receiving, at the at least one server computer, a request to recreate a transaction on the distributed ledger, the transaction having been encrypted using the public key;
   querying, by the at least one server computer, the employee record in the distributed ledger using the corresponding signing key;
   receiving, at the at least one server computer from the distributed ledger, the employee record;
   thereafter creating, at the at least one server computer, a new signing key for the employee record based on the public key;
   storing the new signing key in the distributed ledger, the new signing key associated with the public key; and
   transmitting the new signing key to a client computer.

2. The computer-implemented method of claim 1 further comprising:
   prior to receiving the request to recreate the transaction, receiving, at the at least one server computer, a notification that one of the public key and the signing key have been compromised.

3. The computer-implemented method of claim 1 further comprising:
   receiving, at the at least one server computer, the new signing key from a client computer;
   querying, by the at least one server computer, the employee record in the distributed ledger using the new signing key; and
   transmitting, by the at least one server computer, the employee record to the client computer.

4. The computer-implemented method of claim 1, wherein the distributed ledger comprises a blockchain, and wherein the method further comprises:
   storing additional data on-chain, the additional data associated with the employee record;
   receiving the new signing key; and
   retrieving the additional data along with the employee record.

5. The computer-implemented method of claim 4, wherein the additional data comprises any one of employment history, credentials, skills, appraisals, training, and personal information regarding the employee.

6. The computer-implemented method of claim 1, wherein the distributed ledger comprises a blockchain, and wherein the method further comprises:
   storing additional data off-chain, the additional data associated with the employee record;
   receiving the new signing key;
   retrieving a pointer in the employee record, the pointer pointing to the additional data that is stored off-chain; and
   accessing, using the pointer, the additional data.

7. The computer-implemented method of claim 6, wherein the additional data comprises any one of employment history, credentials, skills, appraisals, training, and personal information regarding the employee.

8. A computer-implemented method of recovering encrypted information that is stored in a distributed ledger implemented solely in a computer network, the computer-implemented method comprising:
   storing, using at least one server computer, an employee record in a blockchain, wherein the employee record is configured to allow a query on the employee record using a public key;

receiving, at the at least one server computer, a request to recreate a transaction on the distributed ledger, the transaction having been encrypted using the public key;

querying, by the at least one server computer, the employee record in the distributed ledger using the public key;

receiving, at the at least one server computer from the distributed ledger, the employee record;

thereafter re-creating, at the at least one server computer, an existing signing key for the employee record based on the public key, wherein a recreated signing key is formed;

transmitting the recreated signing key to a client computer.

9. The computer-implemented method of claim 8 further comprising:

prior to receiving the request to recreate the transaction, receiving, at the at least one server computer, a notification that one of the public key and the signing key have been compromised.

10. The computer-implemented method of claim 8 further comprising:

receiving, at the at least one server computer, the new signing key from a client computer;

querying, by the at least one server computer, the employee record in the distributed ledger using the new signing key; and transmitting, by the at least one server computer, the employee record to the client computer.

11. The computer-implemented method of claim 8 wherein the distributed ledger comprises a blockchain, and wherein the method further comprises:

storing additional data on-chain, the additional data associated with the employee record;

receiving the new signing key; and retrieving the additional data along with the employee record.

12. The computer-implemented method of claim 11, wherein the additional data comprises any one of employment history, credentials, skills, appraisals, training, and personal information regarding the employee.

13. The computer-implemented method of claim 8, wherein the distributed ledger comprises a blockchain, and wherein the method further comprises:

storing additional data off-chain, the additional data associated with the employee record;

receiving the new signing key;

retrieving a pointer in the employee record, the pointer pointing to the additional data that is stored off-chain; and accessing, using the pointer, the additional data.

14. The computer-implemented method of claim 13, wherein the additional data comprises any one of employment history, credentials, skills, appraisals, training, and personal information regarding the employee.

15. A non-transitory computer recordable storage medium storing computer code which, when executed by a processor, performs a computer-implemented method of recovering encrypted information that is stored in a distributed ledger implemented solely in a computer network, the computer code comprising:

computer code for storing, using at least one server computer, an employee record in a blockchain, wherein the employee record is configured to allow a query on the employee record using a public key;

computer code for receiving, at the at least one server computer, a request to recreate a transaction on the distributed ledger, the transaction having been encrypted using the public key;

computer code for querying, by the at least one server computer, the employee record in the distributed ledger using the public key;

computer code for receiving, at the at least one server computer from the distributed ledger, the employee record;

computer code for thereafter re-creating, at the at least one server computer, an existing signing key for the employee record based on the public key, wherein a recreated signing key is formed;

computer code for transmitting the recreated signing key to a client computer.

16. The non-transitory computer recordable storage medium of claim 15, wherein the computer code further comprises:

computer code for prior to receiving the request to recreate the transaction, receiving, at the at least one server computer, a notification that one of the public key and the signing key have been compromised.

17. The non-transitory computer recordable storage medium of claim 15, wherein the computer code further comprises:

computer code for receiving, at the at least one server computer, the new signing key from a client computer;

computer code for querying, by the at least one server computer, the employee record in the distributed ledger using the new signing key; and computer code for transmitting, by the at least one server computer, the employee record to the client computer.

18. The non-transitory computer recordable storage medium of claim 15, wherein the distributed ledger comprises a blockchain, and wherein the computer code further comprises:

storing additional data on-chain, the additional data associated with the employee record;

receiving the new signing key; and retrieving the additional data along with the employee record.

19. The non-transitory computer recordable storage medium of claim 18, wherein the additional data comprises any one of employment history, credentials, skills, appraisals, training, and personal information regarding the employee.

20. The non-transitory computer recordable storage medium of claim 15, wherein the distributed ledger comprises a blockchain, and wherein the computer code further comprises:

storing additional data off-chain, the additional data associated with the employee record;

receiving the new signing key;

retrieving a pointer in the employee record, the pointer pointing to the additional data that is stored off-chain; and accessing, using the pointer, the additional data.

1. A computer-implemented method of verifying employee data of an employee, the employee data stored on a distributed ledger implemented solely in a computer network, the computer-implemented method comprising:

hashing, by at least one server computer, employee data to form hashed data;

storing, by the at least one server computer, the hashed data in the distributed ledger, wherein stored hashed data is formed;

receiving, from a client computer at the at least one server computer, a request to verify the employee data, the request including a digital signature associated with the employee;

responsive to receiving, comparing the stored hashed data with digital signature; and responsive to the digital signature matching information in the stored hashed data, reading the employee data from the distributed ledger, but denying reading the employee data from the distributed ledger if the digital signature does not match the information in the stored hashed data.

2. The computer-implemented method of claim 1, wherein the employee data is stored in security layers associated with different digital signatures, and wherein the digital signature contains security data identifying a level of access to the security layers.

3. The computer-implemented method of claim 1, wherein the employee data is a smart contract.

4. The computer-implemented method of claim 1, wherein the employee data is further encrypted using a public key, and wherein the digital signature further includes a signing key associated with the public key such that the digital signature allows decryption of the employee data.

5. The computer-implemented method of claim 1, wherein the distributed ledger comprises a blockchain, and wherein the method further comprises:
   storing additional data on-chain, the additional data associated with the employee data;
   retrieving the additional data along with the employee data using the digital signature.

6. The computer-implemented method of claim 5, wherein the additional data comprises any one of employment history, credentials, skills, appraisals, training, and personal information regarding the employee.

7. The computer-implemented method of claim 5 wherein the additional data is stored in multiple security layers associated with different digital signatures, and wherein the digital signature contains security data identifying a level of access to the security layers.

8. The computer-implemented method of claim 5, wherein:
   the employee data is stored in security layers associated with different digital signatures;
   the digital signature contains security data identifying a level of access to the security layers;
   the additional data is stored in the multiple security layers; and
   the digital signature contains security data identifying a level of access to the security layers for both the employee data and the additional data.

9. The computer-implemented method of claim 8, wherein the digital signature contains different levels of access to the employee data and the additional data.

10. The computer-implemented method of claim 1 wherein the distributed ledger comprises a blockchain, and wherein the method further comprises:
    storing additional data off-chain, the additional data associated with the employee record;
    storing a pointer in the employee data, the pointer pointing to the additional data that is stored off-chain;
    responsive to the digital signature matching information in the stored hashed data, reading the pointer from the distributed ledger; and
    using the pointer to retrieve the additional data stored off-chain.

11. A non-transitory computer recordable storage medium storing program code which, when executed by a computer, implements a computer-implemented method of verifying employee data of an employee, the employee data stored on a distributed ledger implemented solely in a computer network, the computer code comprising:
    computer code for hashing, by at least one server computer, employee data to form hashed data;
    computer code for storing, by the at least one server computer, the hashed data in the distributed ledger, wherein stored hashed data is formed;
    computer code for receiving, from a client computer at the at least one server computer, a request to verify the employee data, the request including a digital signature associated with the employee;
    computer code for responsive to receiving, comparing the stored hashed data with digital signature; and
    computer code for, responsive to the digital signature matching information in the stored hashed data, reading the employee data from the distributed ledger, but denying reading the employee data from the distributed ledger if the digital signature does not match the information in the stored hashed data.

12. The non-transitory computer recordable storage medium of claim 11, wherein the employee data is stored in security layers associated with different digital signatures, and wherein the digital signature contains security data identifying a level of access to the security layers.

13. The non-transitory computer recordable storage medium of claim 11, wherein the employee data is a smart contract.

14. The non-transitory computer recordable storage medium of claim 11 wherein the distributed ledger comprises a blockchain, and wherein the computer code further comprises:
    computer code for storing additional data on-chain, the additional data associated with the employee data;
    computer code for retrieving the additional data along with the employee data using the digital signature.

15. The non-transitory computer recordable storage medium of claim 14, wherein the additional data is stored in multiple security layers associated with different digital signatures, and wherein the digital signature contains security data identifying a level of access to the security layers.

16. The non-transitory computer recordable storage medium of claim 14, wherein:
    the employee data is stored in security layers associated with different digital signatures;
    the digital signature contains security data identifying a level of access to the security layers;
    the additional data is stored in the multiple security layers; and
    the digital signature contains security data identifying a level of access to the security layers for both the employee data and the additional data.

17. The non-transitory computer recordable storage medium of claim 16, wherein the digital signature contains different levels of access to the employee data and the additional data.

18. A computer comprising:
    a processor; and
    a non-transitory computer recordable storage medium storing program code which, when executed by the processor, implements a computer-implemented method of verifying a smart contract related to payment of an employee, the smart contract stored on a distributed ledger implemented solely in a computer network, the computer code comprising:

computer code for hashing, by at least one server computer, the smart contract to form hashed data;

computer code for storing, by the at least one server computer, the hashed data in the distributed ledger, wherein stored hashed data is formed;

computer code for receiving, from a client computer at the at least one server computer, a request to verify the smart contract, the request including a digital signature associated with the employee;

computer code for responsive to receiving, comparing the stored hashed data with digital signature; and computer code for, responsive to the digital signature matching information in the stored hashed data, reading the smart contract from the distributed ledger, but denying reading the smart contract from the distributed ledger if the digital signature does not match the information in the stored hashed data.

19. The computer of claim 18 further comprising:

responsive to the digital signature matching information in the stored hash data, automatically executing a clause of the smart contract.

20. The computer of claim 19, wherein the clause is payment of the employee by an employer, and wherein the computer code is maintained by a third party company.

1. A computer-implemented method of using a distributed ledger maintained solely in a computer network to increase the efficiency and security of retrieval of data related to an employee having multiple, different sets of data for which different signing key and verification key pairs apply, the computer-implemented method comprising:

receiving, by at least one server computer on the computer network, a request for access to the different sets of data;

linking, by the at least one server computer, the different sets of data to the employee;

simultaneously querying and retrieving the different sets of data from the distributed ledger; and displaying the different sets of data.

2. The computer-implemented method of claim 1, wherein linking the different sets of data to the employee comprises:

prior to receiving, hashing personal information of the employee to form a unique hash associated with the employee;

performing simultaneously querying and retrieving by using the unique hash for querying, and wherein the unique hash is identical for all of the different singing key and verification key pairs.

3. The computer-implemented method of claim 2, wherein the unique hash is performed under a SHA-256 hashing algorithm.

4. The computer-implemented method of claim 2, wherein the personal information comprises a hash of two or more of a social security number of the employee, a name of the employee, a birthdate of the employee, a driver's license number of the employee, a professional license number of the employee, a telephone number of the employee, and an address of the employee.

5. The computer-implemented method of claim 1, wherein the distributed ledger comprises a blockchain.

6. The computer-implemented method of claim 1 further comprising:

sharing the unique hash with a third party to grant the third party access to the different sets of data.

7. The computer-implemented method of claim 6 wherein sharing is performed by a client computer at a request of the employee.

8. A computer comprising:

a processor; and a non-transitory computer recordable storage medium storing computer code which, when executed by the processor, performs a computer-implemented method of using a distributed ledger maintained solely in a computer network to increase the efficiency and security of retrieval of data related to an employee having multiple, different sets of data for which different signing key and verification key pairs apply, the program code method comprising:

program code for receiving, by at least one server computer on the computer network, a request for access to the different sets of data;

program code for linking, by the at least one server computer, the different sets of data to the employee;

program code for simultaneously querying and retrieving the different sets of data from the distributed ledger; and program code for displaying the different sets of data.

9. The computer of claim 8 wherein the wherein the program code for linking the different sets of data to the employee comprises:

program code for, prior to receiving, hashing personal information of the employee to form a unique hash associated with the employee;

program code for performing simultaneously querying and retrieving by using the unique hash for querying, and wherein the unique hash is identical for all of the different singing key and verification key pairs.

10. The computer of claim 9, wherein the unique hash is performed under a SHA-256 hashing algorithm.

11. The computer of claim 9, wherein the personal information comprises a hash of two or more of a social security number of the employee, a name of the employee, a birthdate of the employee, a driver's license number of the employee, a professional license number of the employee, a telephone number of the employee, and an address of the employee.

12. The computer of claim 8, wherein the distributed ledger comprises a blockchain.

13. The computer of claim 8, wherein the program code further comprises:

program code for sharing the unique hash with a third party to grant the third party access to the different sets of data.

14. The computer of claim 13, wherein sharing is performed by a client computer at a request of the employee.

15. A non-transitory computer recordable storage medium storing computer code which, when executed by the processor, performs a computer-implemented method of using a distributed ledger maintained solely in a computer network to increase the efficiency and security of retrieval of data related to an employee having multiple, different sets of data for which different signing key and verification key pairs apply, the program code method comprising:

program code for receiving, by at least one server computer on the computer network, a request for access to the different sets of data;

program code for linking, by the at least one server computer, the different sets of data to the employee;

program code for simultaneously querying and retrieving the different sets of data from the distributed ledger; and program code for displaying the different sets of data.

16. The non-transitory computer recordable storage medium of claim 15, wherein the program code for linking the different sets of data to the employee comprises:

program code for, prior to receiving, hashing personal information of the employee to form a unique hash associated with the employee;

program code for performing simultaneously querying and retrieving by using the unique hash for querying, and wherein the unique hash is identical for all of the different singing key and verification key pairs.

17. The non-transitory computer recordable storage medium of claim 16, wherein the unique hash is performed under a SHA-256 hashing algorithm.

18. The non-transitory computer recordable storage medium of claim 16, wherein the personal information comprises a hash of two or more of a social security number of the employee, a name of the employee, a birthdate of the employee, a driver's license number of the employee, a professional license number of the employee, a telephone number of the employee, and an address of the employee.

19. The non-transitory computer recordable storage medium of claim 15, wherein the distributed ledger comprises a blockchain.

20. The non-transitory computer recordable storage medium of claim 15, wherein the program code further comprises:

program code for sharing the unique hash with a third party to grant the third party access to the different sets of data, and wherein sharing is performed by a client computer at a request of the employee.

What is claimed is:

1. A computer-implemented method comprising:

receiving, by at least one server computer, a wage payment information from an employer regarding an employee;

receiving, by the at least one server computer, a copy of a first digital public key uniquely associated with the employee and a copy of a second digital public key uniquely associated with the employer;

issuing, by the at least one server computer, a transaction to a distributed ledger maintained solely in a computer network performing wage issuance, the transaction comprising the wage payment information and identity data uniquely associated with the employee, the identity data being multi-level identity data based on levels of data sensitivity, the identity data including information controlled by the employee and the employer to designate which level of the identity data can be accessed using a data level code and a first digital signing key belonging to the employee and a second digital signing key belonging to the employer, and the identity data encrypted with the first digital public key and the second digital public key;

receiving, by the at least one server computer, a designation that identifies a third party with a level of the identity data of the employee, the third party accessing the level of the identity data, decrypted with the first digital signing key and the second digital signing key, using the data level code; and giving the employer control over access permission to the identity data based on the identity data being multi-level identity data based on levels of data sensitivity.

2. The computer-implemented method of claim 1 further comprising:

transmitting, by the at least one server computer, the first digital signing key and the data level code to the employee.

3. The computer-implemented method of claim 1 further comprising:

receiving, by the at least one server computer, the first digital signing key, the second digital signing key, and the data level code identifying a level of the identity data; and reading, by the at least one server computer, the level of the identity data from the distributed ledger.

4. The computer-implemented method of claim 3 further comprising:

receiving, by the at least one server computer, a first decryption function using the first digital signing key;

receiving, by the at least one server computer, a second decryption function using the second digital signing key;

decrypting, by the at least one server computer, encrypted data using the first digital signing key and the second digital signing key to form unencrypted data; and supplying, by the at least one server computer, the unencrypted data to a third party.

5. The computer-implemented method of claim 1 further comprising:

using, by the at least one server computer, the identity data, the first digital signing key, and the second digital signing key for verifying an identity of the employee.

6. The computer-implemented method of claim 1, wherein the distributed ledger comprises a blockchain and wherein the computer-implemented method further comprising:

associating, by the at least one server computer, the identity data with biometrics about the employee, the biometrics stored as hashed data on-chain.

7. The computer-implemented method of claim 6, wherein the hashed data on-chain comprises any one of employment history, credentials, skills, appraisals, training, and personal information regarding the employee.

8. The computer-implemented method of claim 6 further comprising:

associating, by the at least one server computer, the identity data with additional off-chain data about the employee.

9. The computer-implemented method of claim 8, wherein the additional off-chain data comprises any one of employment history, credentials, skills, appraisals, training, and personal information regarding the employee.

10. The computer-implemented method of claim 1 further comprising:

associating, by the at least one server computer, the identity data with off-chain data about the employee.

11. The computer-implemented method of claim 10, wherein the off-chain data comprises any one of employment history, credentials, skills, appraisals, training, and personal information regarding the employee.

12. The computer-implemented method of claim 1, wherein the distributed ledger comprises a blockchain.

13. A computer comprising:

a processor; and a computer readable storage media storing computer code thereon, which when executed by the processor, causes the processor to perform the steps of:

receiving a wage payment information from an employer regarding an employee;

receiving a copy of a first digital public key uniquely associated with the employee and a copy of a second digital public key uniquely associated with the employer;

issuing a transaction to a distributed ledger maintained solely in a computer network at a time of wage issuance, the transaction comprising the wage payment information and identity data uniquely associated with the employee, the identity data being multi-level identity data based on levels of data sensitivity, the identity data including information controlled by the employee and the employer to designate which level of the identity data can be accessed using a data level code and a first digital signing key belonging to the employee and a second digital signing key belonging to the employer, and the identity data encrypted with the first digital public key and the second digital public key;

receiving a designation that identifies a third party with a level of the identity data of the employee, the third party accessing the level of the identity data, decrypted with the first digital signing key and the second digital signing key, using the data level code; and giving the employer control over access permission to the identity data based on the identity data being multi-level identity data based on levels of data sensitivity.

14. The computer of claim 13, wherein the computer code further causes the processor to perform the steps of:
transmitting the first digital signing key and the data level code to the employee.

15. The computer of claim 13, wherein the computer code further causes the processor to perform the steps of:
receiving the first digital signing key, the second digital signing key, and the data level code identifying a level of the identity data; and
reading the level of the identity data from the distributed ledger.

16. A computer readable storage media comprising:
computer code stored on the computer readable storage media, which when executed by a processor, causes the processor to perform the steps of:
receiving a wage payment information from an employer regarding an employee;
receiving a copy of a first digital public key uniquely associated with the employee and a copy of a second digital public key uniquely associated with the employer;
issuing a transaction to a distributed ledger maintained solely in a computer network at a time of wage issuance, the transaction comprising the wage payment information and identity data uniquely associated with the employee, the identity data being multi-level identity data based on levels of data sensitivity, the identity data including information controlled by the employee and the employer to designate which level of the identity data can be accessed using a data level code and a first digital signing key belonging to the employee and a second digital signing key belonging to the employer, and the identity data encrypted with the first digital public key and the second digital public key;

receiving a designation that identifies a third party with a level of the identity data of the employee, the third party accessing the level of the identity data, decrypted with the first digital signing key and the second digital signing key, using the data level code; and giving the employer control over access permission to the identity data based on the identity data being multi-level identity data based on levels of data sensitivity.

17. The computer readable storage media of claim 16, wherein the computer code further causes the processor to perform the steps of:
transmitting the first digital signing key and the data level code to the employee.

18. The computer readable storage media of claim 16, wherein the computer code further causes the processor to perform the steps of:
receiving the first digital signing key, the second digital signing key, and the data level code identifying a level of the identity data; and
reading the level of the identity data from the distributed ledger.

19. The computer-implemented method of claim 1 further comprising:
making, by the at least one server computer, the level of the identity data, decrypted with the first digital signing key and the second digital signing key, available to the third party.

20. The computer of claim 13, wherein the computer code further causes the processor to perform the step of:
making the level of the identity data, decrypted with the first digital signing key and the second digital signing key, available to the third party.

21. The computer readable storage medium of claim 16, wherein the computer code further causes the processor to perform the step of:
making the level of the identity data, decrypted with the first digital signing key and the second digital signing key, available to the third party.

22. The computer of claim 13, wherein the computer code further causes the processor to perform the step of:
using the identity data and encrypting a certain level of the identity data with the public key of the employer and subsequently allowing the employer to decrypt the certain level of the identity data giving the employer control over the certain level of the identity data.

23. The computer readable storage media of claim 16, wherein the computer code further causes the processor to perform the step of:
using the identity data and encrypting a certain level of the identity data with the public key of the employer and subsequently allowing the employer to decrypt the certain level of the identity data giving the employer control over the certain level of the identity data.

* * * * *